COMPILING CIRCUITRY FOR A HIGHLY-PARALLEL COMPUTING SYSTEM

Filed Aug. 13, 1964 13 Sheets-Sheet 1

OUTPUT UNIT

INVENTORS
CHARLES V. FREIMAN
HERBERT HELLERMAN
BY [signature]
ATTORNEY

FIRST PASS

SECOND PASS

Sept. 19, 1967 C. V. FREIMAN ET AL 3,343,135

COMPILING CIRCUITRY FOR A HIGHLY-PARALLEL COMPUTING SYSTEM

Filed Aug. 13, 1964 13 Sheets-Sheet 6

United States Patent Office 3,343,135
Patented Sept. 19, 1967

3,343,135

COMPILING CIRCUITRY FOR A HIGHLY-PARALLEL COMPUTING SYSTEM

Charles V. Freiman, Pleasantville, and Herbert Hellerman, Yorktown Heights, N.Y., assignors to International Business Machines Corporation, New York, N.Y., a corporation of New York Filed Aug. 13, 1964, Ser. No. 389,287
25 Claims. (Cl. 340—172.5)

ABSTRACT OF THE DISCLOSURE

A system is disclosed for automatically determining the parallel execution opportunities in a mathematical expression and for subsequently supplying same to a multi-processor computing system in an optimized sequence. The system requires that the expression be written in a grouped parenthesis-free notation such as Reverse Polish. The logic built into the system is such that it is able to go through the expression on a first pass and determine the earliest relative time sequence during which each operation may be performed and then go back through the expression in the opposite direction and determine the latest relative time during which each operation may be performed. Additional logic circuitry is supplied for providing specific operations, i.e., operands and operators to different ones of said processors in an optimized manner using the results of the previous two passes.

The present invention relates to a system for automatically determining parallel execution opportunities in a mathematical expression. More particularly, it relates to a system for analyzing a mathematical expression and selecting those terms of same which are susceptible of execution in similar time periods.

In the present state of the computer art, it is a continuing goal to build larger, more complicated computers capable of solving problems in shorter periods of time. Continuing efforts in research and engineering are directed towards this goal. Memories having shorter and shorter access cycles are continually being developed as well as logic circuitry and logic components capable of performing their various operations in ever decreasing periods of time. The trade-offs between time and cost are extremely complicated and interdependent. However, it is generally conceded in the computer industry that in spite of increased costs, the faster computers are generally the more economical in unit cost per computation. In view of this overriding consideration which is generally accepted by the industry as a whole, constant efforts are made to decrease the total time in which a given problem may be solved.

It is well known that in the average mathematical problem there are a large number of individual operations which must be performed before a final result may be obtained. In the majority of existing computers, a given mathematical problem is solved step by step in accordance with instructions from a program. This is because said computers have but one arithmetic unit which is capable of performing only one operation at a time even though it may be capable of performing many operations in a relatively short time. Thus, it is only possible to perform a single operation in any one time period on these computers. Recently, however, at least one computer has come on the market having a central arithmetic unit with a plurality of processors therein which are capable of operating in parallel. However, it is necessary for the programmer in this case to be aware of the exact number of processors he has available and to break down his mathematical problem to take advantage of the particular structure of the computer. Such study and manipulation of a problem is extremely time consuming and it is often difficult to achieve such a program that is free of errors. The result of such a final program, however, is one wherein the machine is able to execute a given mathematical expression with at least some degree of parallelism and thus, effect a saving in over-all time for the ultimate computation of said problem.

It may thus be seen that a promising method in which over-all computer speed may be generally enhanced is by developing a machine which is able to automatically analyze a mathematical expression and determine which steps are performable within concurrent time sequences and automatically provide an indication of such opportunities to a highly parallel computing system. It is apparent that such a system is highly advantageous where real time problems must be solved, i.e., problems where computing time is of utmost importance such as fire control computers, computers designed to analyze ICBM trajectories in cooperation with various radar installations, satellite control computers and the like. Such a system further generally upgrades the capabilities of relatively standard systems if they are provided with a plurality of arithmetic processors. A further desirable feature of parallel processing systems is the inherent reliability gained by having available many similar processing units thus protecting against system failure if some but not all of the units should fail.

It has now been found that it is possible to automatically analyze an algebraic parentheses free expression and determine concurrent execution opportunities for the various operations anticipated by the expression and automatically provide instructions to a multiple processor system for performing said expression in a greatly reduced time cycle. The system requires that the mathematical or algebraic expression be written in a parentheses free rotation such as Reverse Polish notation which will be explained more fully subsequently but which can be generally described as a notation wherein operands appear in groups succeeded by groups of operators spatially related thereto. Means for the translation of standard parenthesized expressions to Polish form are well known and hence are not as such intended to form a part of the present invention.

It is accordingly a primary object of the present invention to provide a system for determining parallel execution opportuntities in algebraic expressions.

It is a feature object to provide such a system capable of determining the earliest time in which a given operation within an algebraic expression may be performed.

It is yet another object to provide such a system capable of determining the latest time period in which each operation may be performed.

It is another object to combine the determination of latest and earliest times during which a given operation can be performed, combine same and optimize the utilization of a plurality of processor units in parallel execution of the expression.

It is another object to provide a system and control circuits therefor capable of performing the foregoing objects.

The foregoing and other objects, features and advantages of the invention will be apparent from the following more particular description of preferred embodiments of the invention, as illustrated in the accompanying drawings.

Figure 4A:
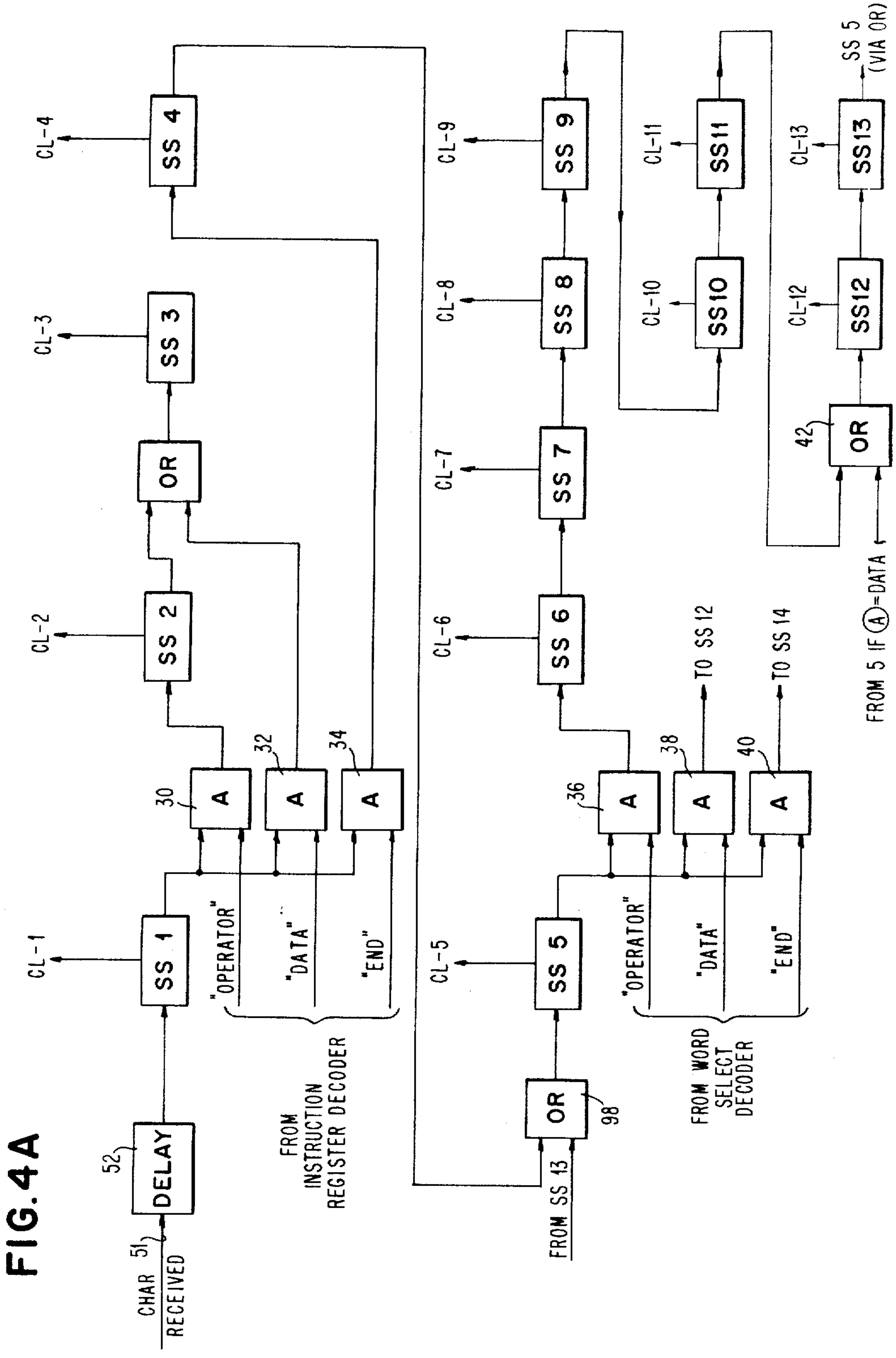
Figure 4B:
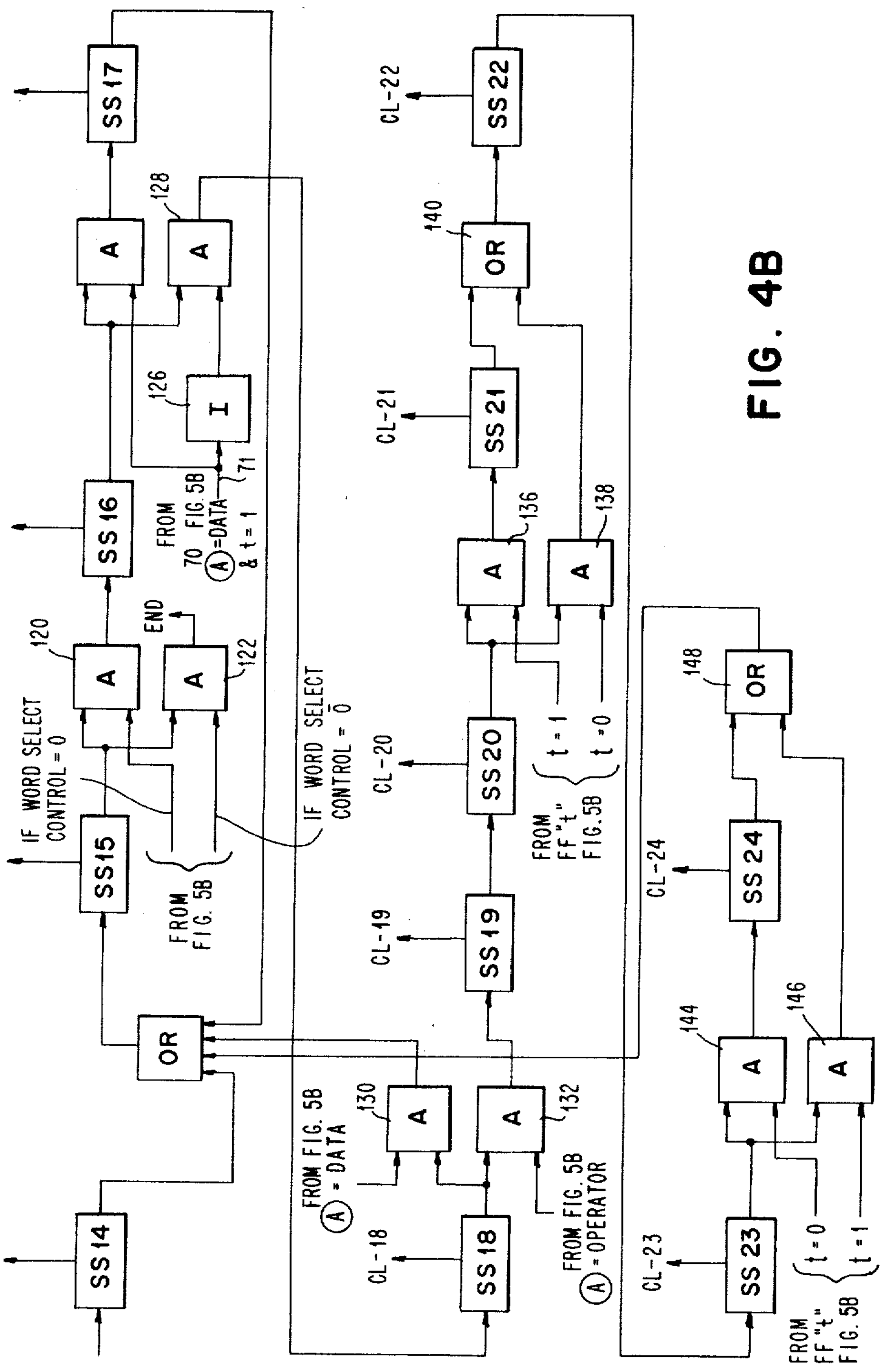

FIGURES 4A and 4B comprise a logical schematic diagram of the timing circuit utilized in the illustrated embodiment of the invention.

Figure 5A:
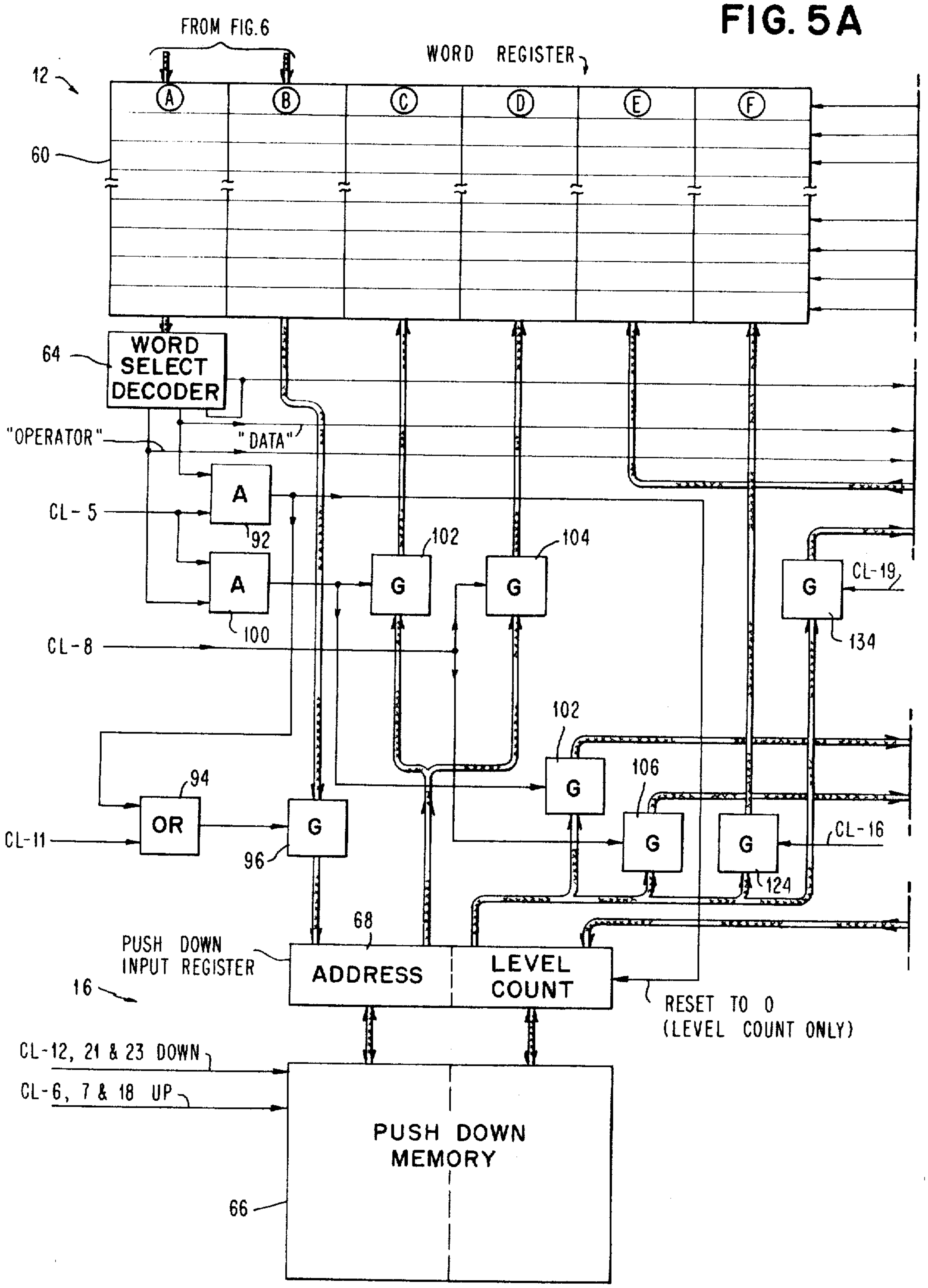
Figure 5B:
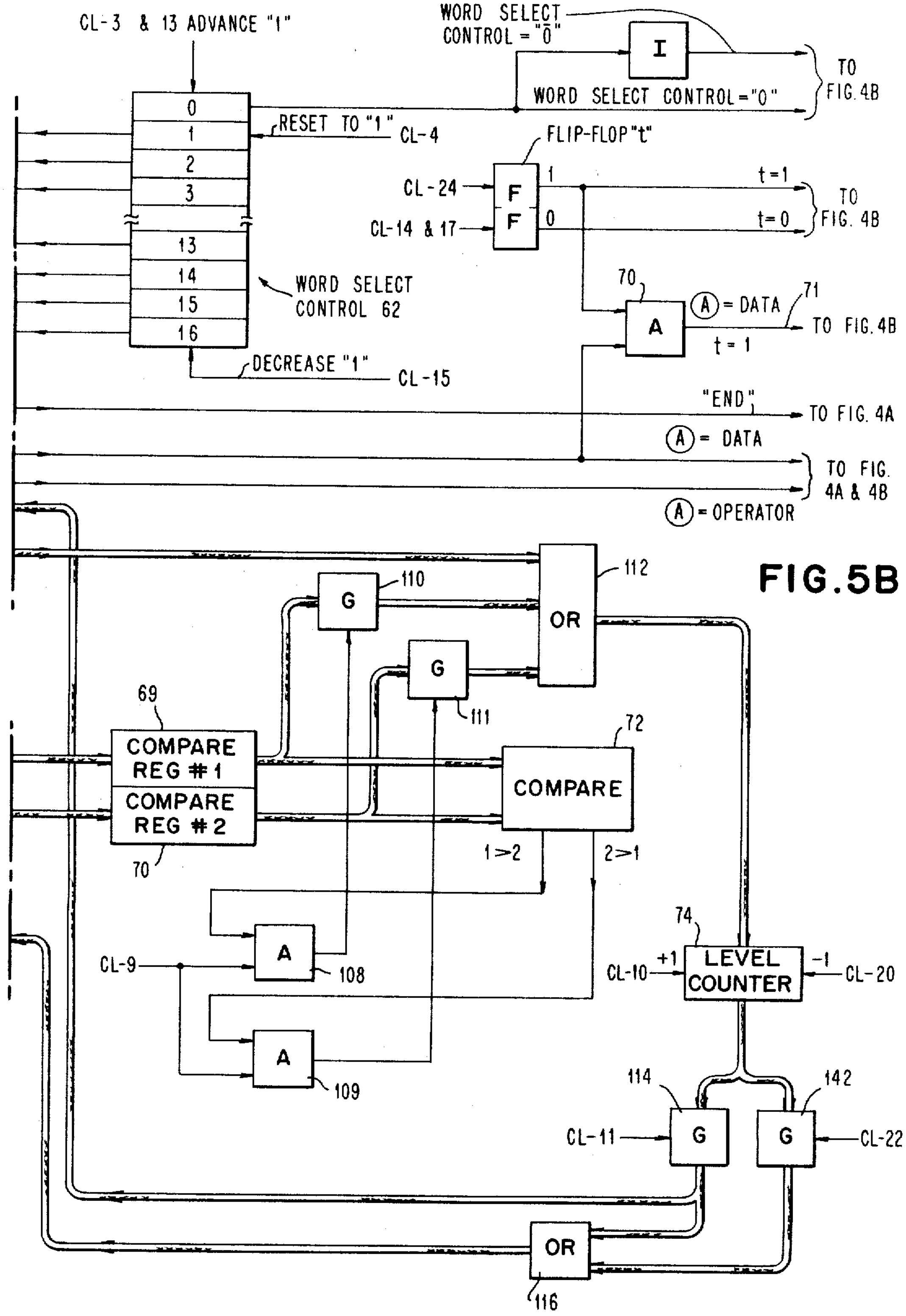

FIGURES 5A and 5B comprise a logical schematic diagram of the input portion of the system which analyzes an incoming mathematical expression and determines the proper sequencing for operations.

Figure 6:
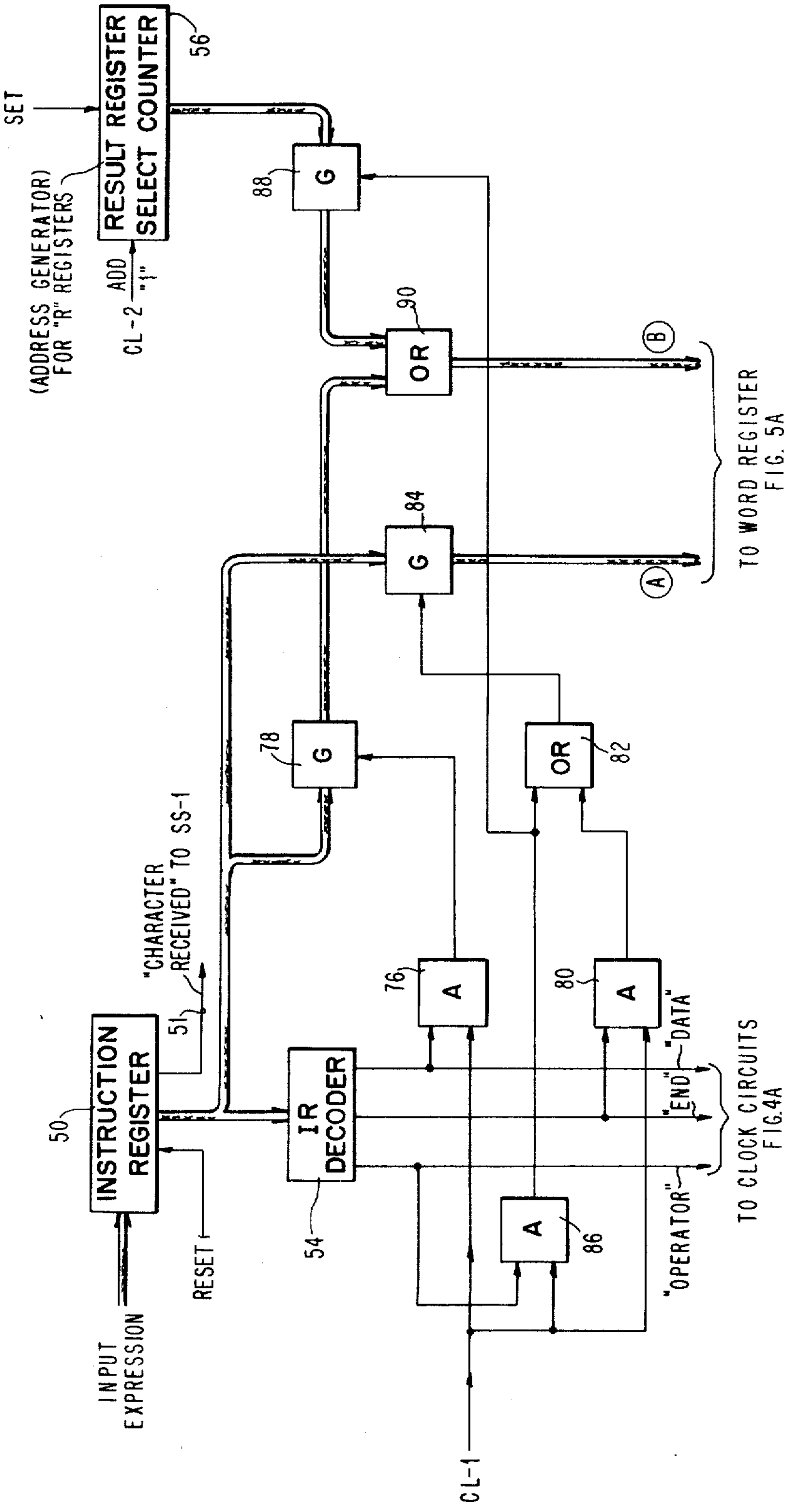

FIGURE 6 is a logical schematic diagram of the Input Unit which actually gates a mathematical expression into the system a character at a time for analysis and also provides addresses in a local memory where intermediate results are to be stored.

Figure 7A:
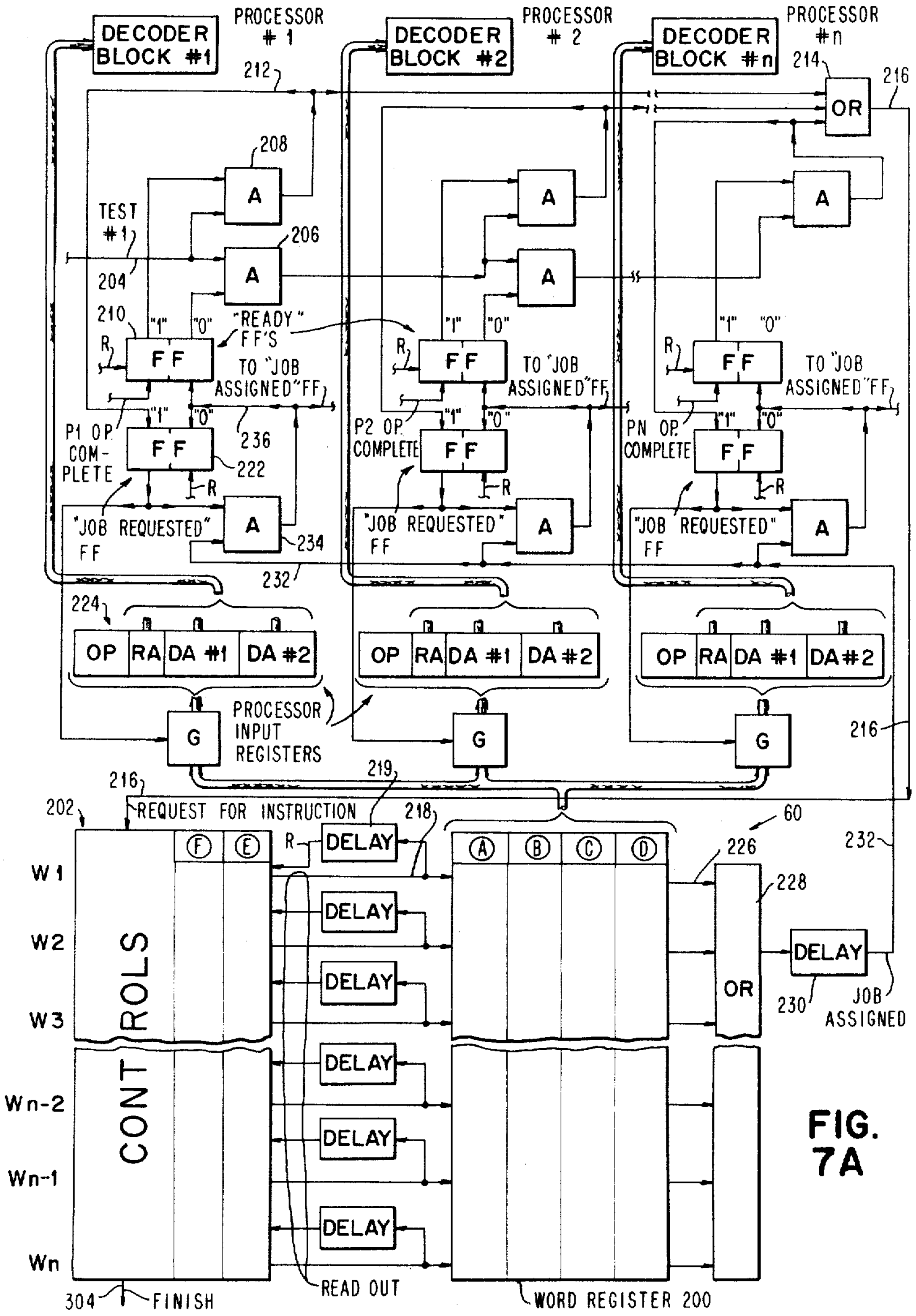

FIGURE 7A is a logical schematic diagram of the output portion of the system which controls the assignment of various operations of the last analyzed instruction to a multiprocessor computer.

Figure 7B:
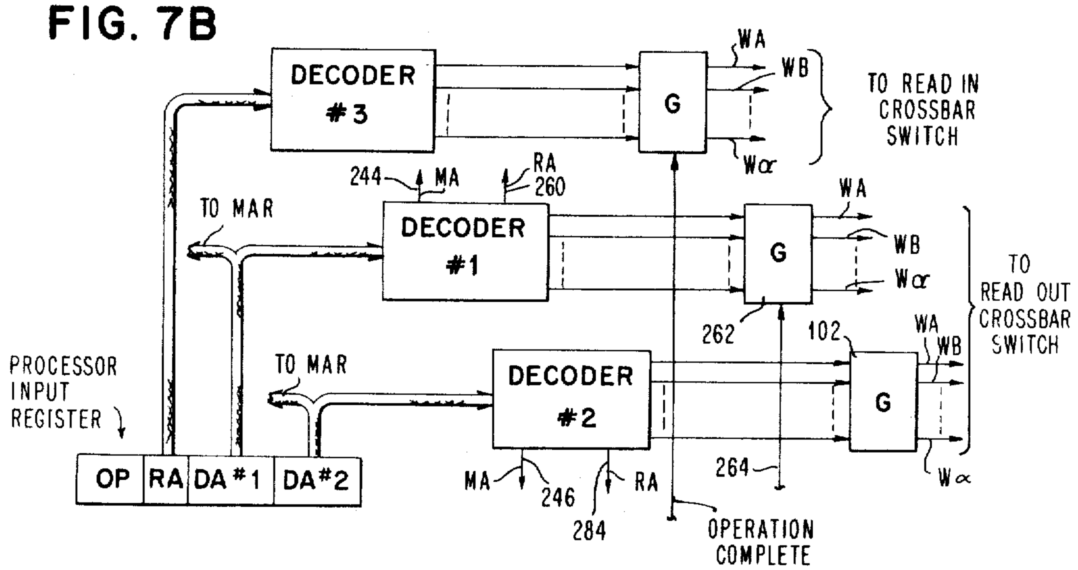

FIGURE 7B is a logical schematic diagram showing the contents of the Decoder blocks of FIGURE 7A.

Figure 8:
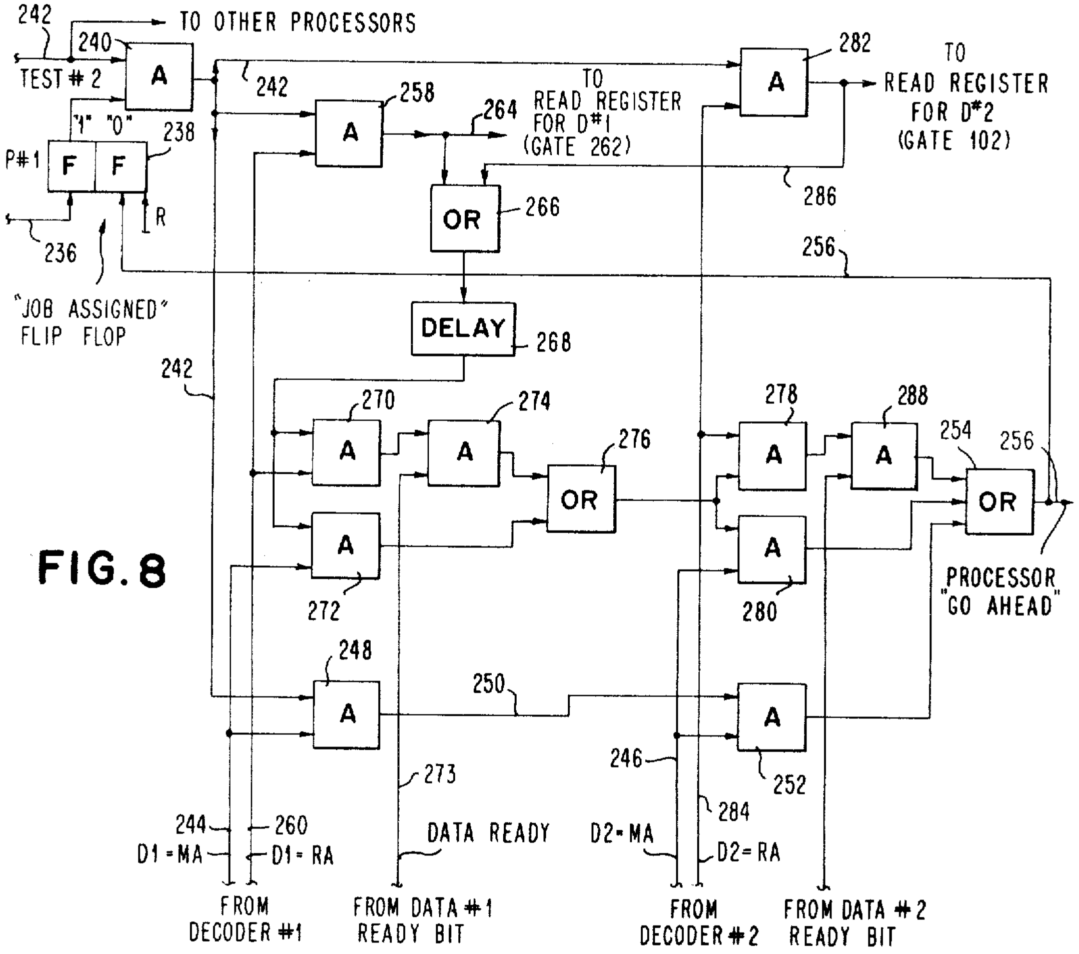

FIGURE 8 is a logical schematic diagram of the controls associated with each processor for determining whether the specified operands of an assigned operation are available and the processor can "go ahead."

Figure 9:
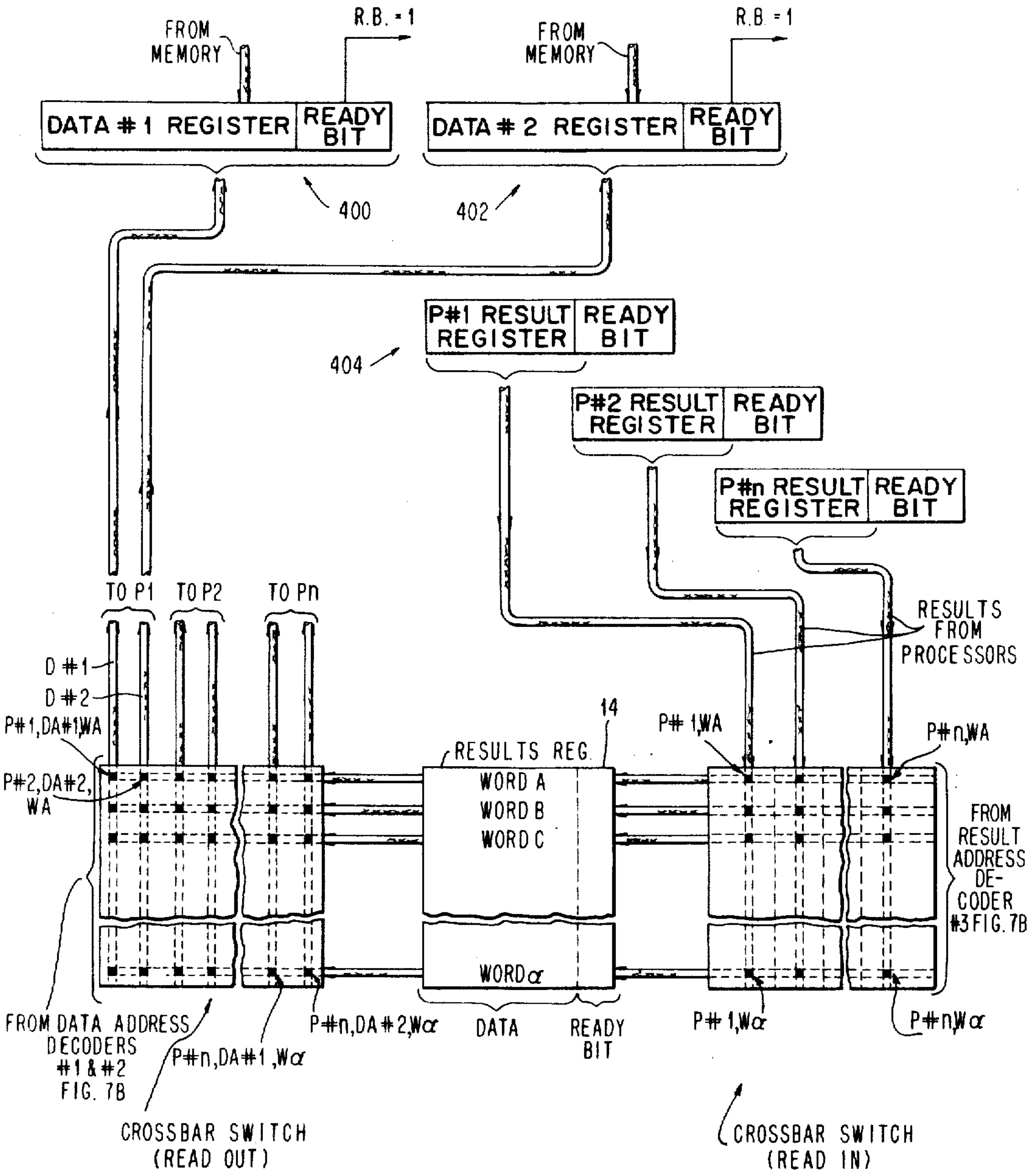

FIGURE 9 is a logical schematic of the system Results Register showing the relationship of the Crossbar Switches, the Results Register and the various processor, operand and result registers.

Figure 10:
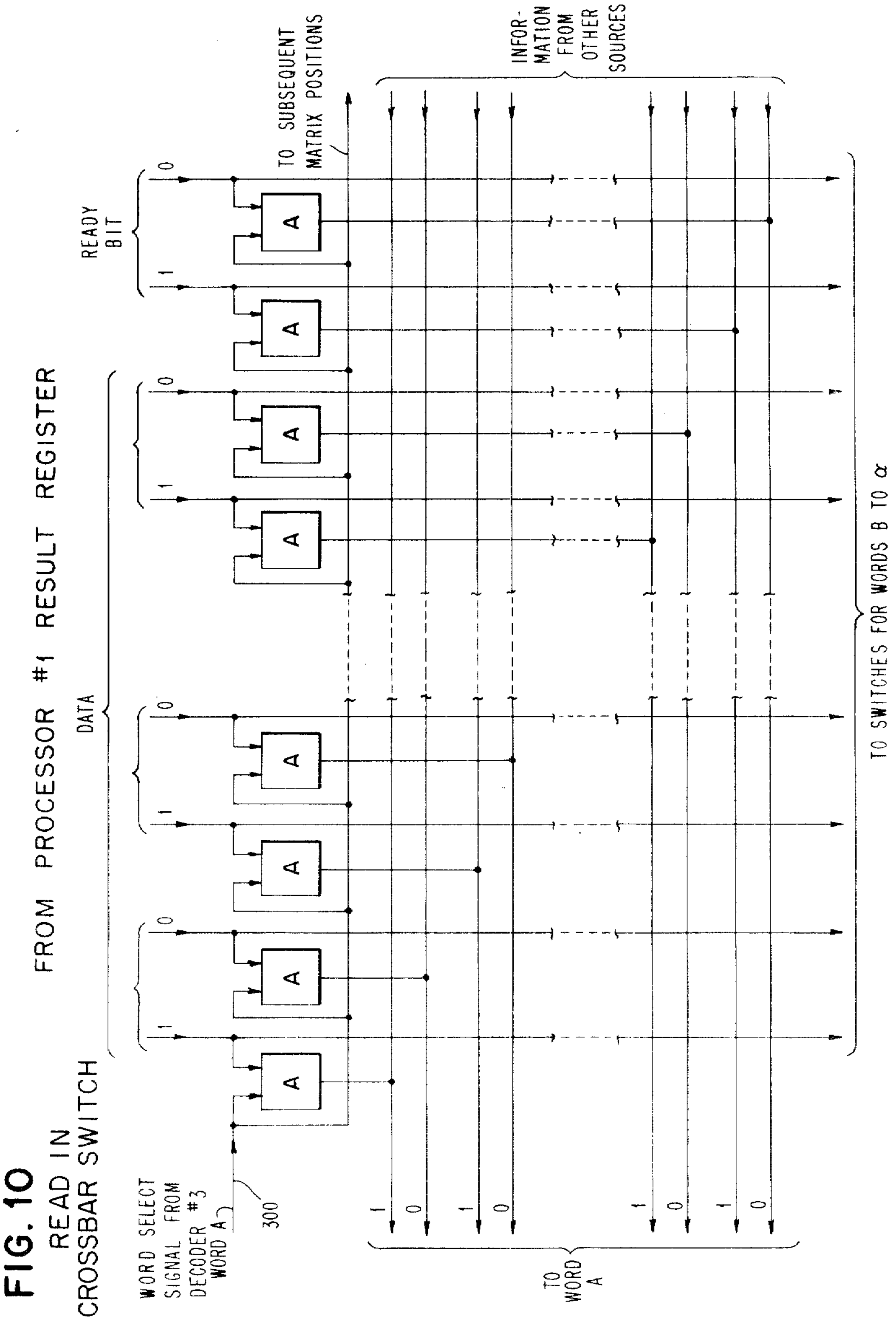

FIGURE 10 is a logical schematic of a section of the "read in" Crossbar Switch of FIGURE 9.

Figures 11, 12:
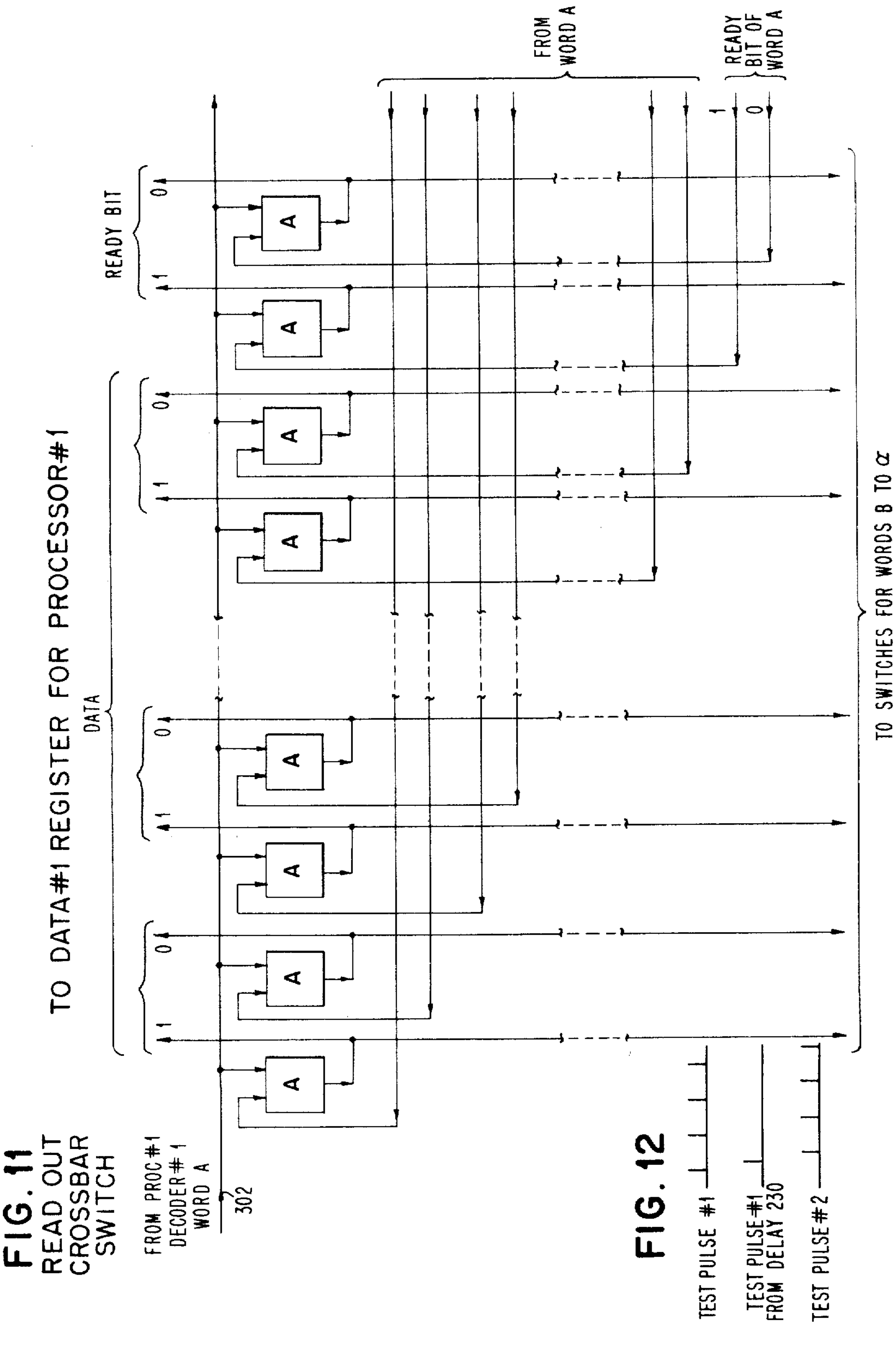

FIGURE 11 is a logical schematic of a section of the "read out" Crossbar Switch of FIGURE 9.

FIGURE 12 is a timing chart showing the timing relationships between test pulse #1, test pulse #1 delayed and test pulse #2.

The objects of the present invention are accomplished in general by a computing system for operating on a mathematical expression written in a grouped parentheses free notation. The system comprises a plurality of arithmetic devices capable of simultaneous operation and means responsive to the mathematical expression and independent of the state of any arithmetic device for establishing indications of the precedence level of each operation contained in the expression. Means are further provided responsive to said precedence indications for effecting the grouping of equi-precedent level operations as well as means for controlling the application of the data to the arithmetic devices for concurrent calculation of each operation.

The type of grouped parentheses free notation referred to above would be, for example, Reverse Polish notation wherein operands and operators appear in the expression in groups and wherein specific operands are related to specific operators within groups according to a defined relationship. The particular relationship for a Reverse Polish notation will be explained subsequently with reference to several examples.

According to a first aspect of the invention, the system analyzes such an algebraic expression and automatically determines and lists each operation as falling within a relative time period beginning with a one time in which given operations may first be accomplished. This one time would be the time in which all first order operations could be accomplished and subsequent higher order times would proceed therefrom.

According to a further aspect of the invention, the expression is analyzed first to determine the earliest times during which each operation may be performed starting with said abovementioned one time and is subsequently analyzed to determine the latest time during which a particular operation may be performed. The system prepares a list of operations for a particular algebraic expression which indicates both the earliest and the latest relative time within which a particular operation within said expression may be performed. The read out or assignment portion of the system analyzes the expression utilizing the combination list, i.e., earliest and latest times to achieve a more economical utilization of a plurality of arithmetic units in a multiprocessor computing system, subject to minimum number of time intervals required for evaluation of the arithmetic expression. In other words, examining at both the earliest and latest times during which an operation may be performed, it will determine if a particular operation may best be held off until a subsequent operation remotely located within the expression should be performed because its results will be needed immediately while the result of another operation which can be performed immediately will not be needed for some number of time periods subsequent in the performance of the operation.

The system comprises a unique combination of essentially standard building blocks utilized and organized in a unique manner to analyze a given algebraic expression written in such grouped parentheses free notation for preparing a time sequence list for each operation and finally, assigning such operations to a multiprocessor computing system to achieve optimum utilization of said system and at the same time, accomplishing performance of the problem in minimal time.

Figure 2:
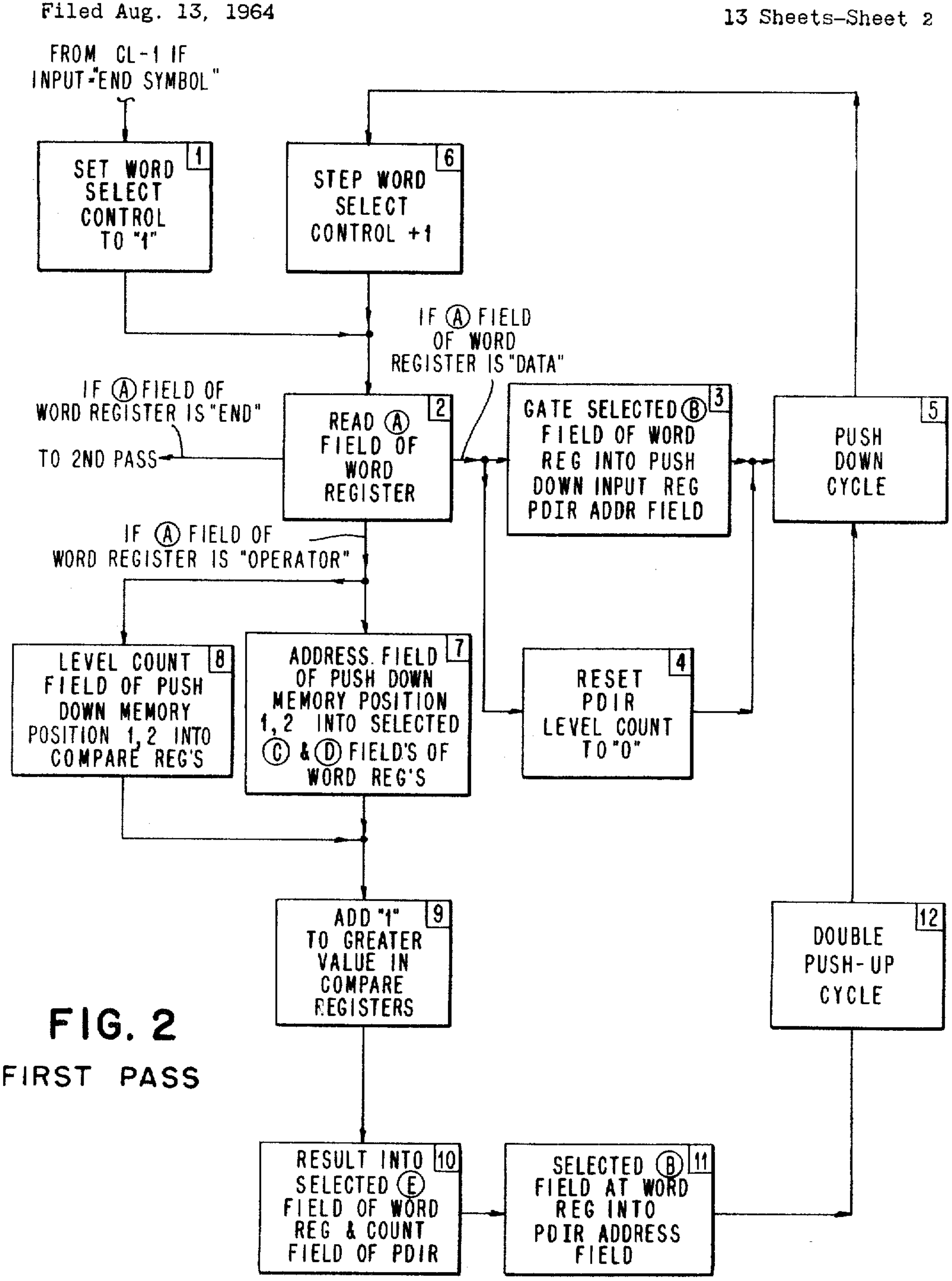
FIGURE 2 is a flow diagram of the "first pass" whereby the system analyzes a mathematical expression to determine the earliest relative times in which given operations may be performed.
Figure 3:
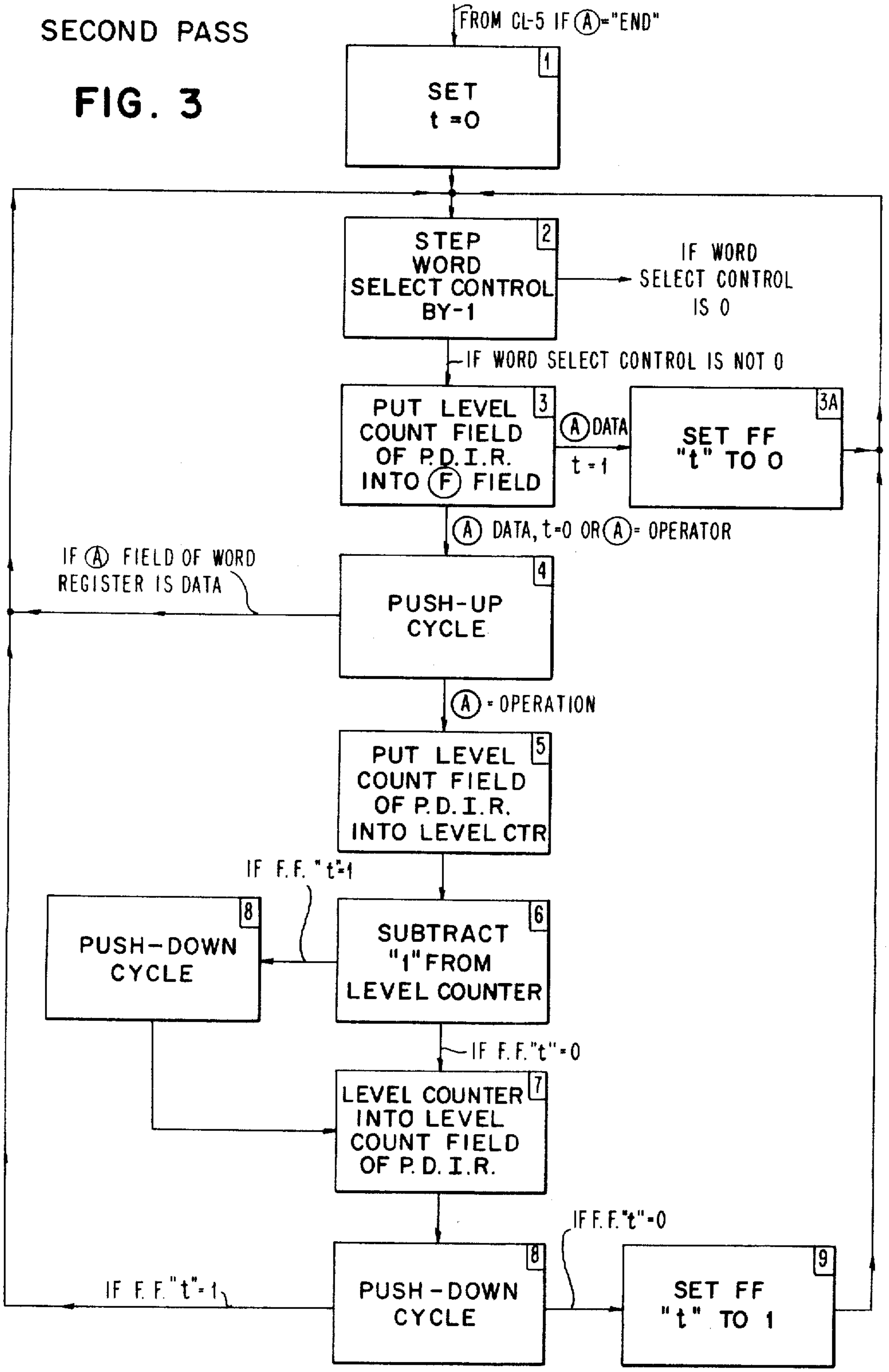
FIGURE 3 is a flow diagram of the "second pass" for analyzing said expression wherein the system determines the latest relative time in which a particular operation may be performed.

The drawings illustrate a number of different aspects of the invention. FIGURE 1 is a conventional functional block diagram wherein the major functional sections of the system are clearly indicated. Examination of this figure, together with the description thereof which will follow, will provide a general understanding of the objects and operation of the present invention. FIGURES 2 and 3 are essentially flow charts and explain the operation of the present system in terms of the functions performed thereby or stated alternatively, the sequence of steps together with the various branches which are necessitated by certain occurrences in a particular problem.

FIGURES 4A and 4B constitute a logical schematic of the timing controls for the input portion of the system illustrated in FIGURES 5A and 5B and an examination of this figure clearly indicates the method by which timing in the embodiment of the invention illustrated in FIGURES 5A and 5B is achieved. FIGURES 4A and 4B clearly illustrate the branching points and the manner in which certain tests are made and the location of such tests in the clock or timing cycle. FIGURES 5A, 5B and 8 comprise logical schematic diagrams of the input and read out or perform operation portion of the system. The drawings are conventional logical schematics where gate circuits, memories, registers, etc., are indicated as blocks. The contents of these blocks are quite well known in the art and may be chosen from any of a very large number of available circuits constructed of vacuum tubes, solid state devices, cryogenic elements, etc. Reference is specifically made to the books "Arithmetic Operations in Digital Computers" by R. K. Richards, D. Van Nostrand and Co., New York, 1955 and "Digital Computers Components and Circuits" by R. K. Richards, D. Van Nostrand and Co., New York, 1956. Typical components to fill in any of these blocks may be obtained in these as well as many other volumes. It should be understood that the implementation would not be limited to tubes, semiconductor or cryogenic circuitry as of many other families of components could equally well be used.

As stated previously in the specification, it is well known that any given mathematical instruction or algebraic expression may well have at a number of different locations, operations which may be performed simultaneously. The opportunities for such parallel performance may normally be seen quite clearly by analyzing any expression as a tree, wherein all of the raw data appears across the upper line and the data is brought down at intersecting points for each indicated operation. Each such intersection, of course, is the result of a particular sub-operation which will be used in a subsequent indicated operation. Specific examples of mathematical expressions and tree structures are indicated in the subsequent examples which will be described more fully subsequently but which may be cursorily examined and in which example it will be seen that it is possible to draw horizontal lines through various intersection points, which lines are representative of operations capable of concurrent execution. While anyone may analyze an algebraic expression in this manner to determine parallel performance opportunities, it is apparent that such charting is an extremely time consuming operation and once achieved, still requires considerable programming before an instruction may be conveyed to a computing system. It further requires a great deal of computation to determine how the instructions should be grouped in order to obtain optimum utilization of said system. The present system automatically accomplishes the determination of the parallel processing opportunities and further provides a means for assigning operations automatically to a plurality of process untis to achieve a good utilization of said process units.

Before proceeding further with an explanation of the invention, it is necessary to understand the particular type of parentheses free notation used with the illustrative embodiment of the present invention, which notation is the Reverse Polish form. Take for example, the following algebraic expression:

(a) $[a*(b*(c+d))]*[e*(f*(g+h))]$ (In the above expression, the * denotes multiplication.) It will be seen from the above expression that the two bracketed terms, each of which is a relatively complex expression requiring a certain order of operations, is in turn to be multiplied as the final result. In the Reverse Polish form, such an expression is written without brackets or parentheses in the following manner:

(b) $abcd+efgh+*::$

In the above expression, the :: is used to indicate the "end" of the expression as will be explained subsequently. In the Reverse Polish form, i.e., Formula *b* above, the groups of operators refer to the adjacent operands to the left. Thus, in the above formula, the first + operator refers to the operands *c* and *d* and the first * operator refers to the first operand as defined by the result of $c+d$ and the second operand as *b*. The second * symbol on the other hand refers to the combination result of the proceeding + and * operation and as its second operand refers to the *a*. The second group of symbols, i.e., *efgh* and its associated group of operands +*** relate to its associated group of operands in the same manner. It will be noted, however, that the last * operator to the right refers to the two grouped expressions for its operands since the entire term ($efgh+**$) forms one of the operands for such operator. This latter multiplication symbol is the same as the multiplication symbol between the two bracketed expressions of Formula *a*. It will thus be seen that any standard algebraic expression may be written in Reverse Polish form. Articles on Polish notation may be found in any number of mathematical text books. Such a text book is "A Programming Language" by K. E. Iverson, John Wiley and Son, 1962.

It will be obvious from the above description of the Reverse Polish form that grouped expressions may be written in other forms such, for example, as one wherein the operators would precede the operands. While the present invention is described as utilizing a Reverse Polish notation, it will be obvious to a person skilled in the art that certain modifications in the timing circutiry, etc., would enable the evaluation of a grouped parentheses free notation form such as the one mentioned above. Such modifications could be achieved by a person skilled in the art following the teachings of the present invention.

Having thus described the problem to be solved by the present invention, the manner in which it is solved will be apparent from the following more particular description of typical examples and the illustrated embodiment of the invention with reference to the drawings.

As illustrated above, a given algebraic expression may be written in a number of different forms, either as a conventional algebraic expression or in the Reverse Polish notation utilized with the instant embodiment of the present invention. Depending on the particular operations called for, an expression may be written having either a number of groups of operators and operands or data or, conversely, may have relatively few groups of operators and operands. This, as will be understood, is due to the nature of the mathematical operation involved and determines whether a given pair of operands and its operator have to be performed at a given point to form a result which is to be itself an operand or whether the individual operands of a group may be alternatively grouped with still other operators. In the examples which will be discussed in explaining the present invention, it will in all likelihood be apparent that the expressions could be written in alternative forms. However, it is the intention of the present system only to operate upon a Reverse Polish expression as received and does not involve optimizing the instruction.

The underlying theory of operation on which the present invention is based is that when scanning a grouped parentheses free type of notation such as Reverse Polish, one encounters consecutive groups of operands and operators wherein any given set of operands relates to a particular operator in its particular group. And further, that when a particular operator requires the result of a previous operation as one of its operands, this can be determined from the order of the expression itself. Thus, it may be stated generally in referring to a given Polish notation expression that if upon examining the complete expression, it is noted that there are a plurality of groups of operands and operators within the expression, that it is possible to determine which instructions may be performed immediately and which instructions require the performance of a previous instruction before they can in turn be performed.

Referring now to Example I, certain characteristics of an algebraic expression will be apparent.

EXAMPLE I

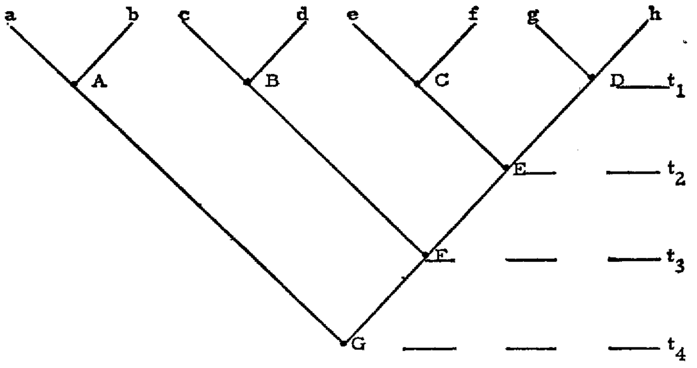

(1)

D C E B F A G gh + ef + * cd + * ab + * :: (2)

$(((g+h)*(e+f))*(c+d))*(a+b)$ (3)

It will be seen from the above Example I that the additions indicated within the parentheses of part (3), i.e., $g+h$, $e+f$, $c+d$ *and* $a+b$ may all be performed concurrently. This is apparent from the tree structure of part (1) of the example. Each result of these four factors is indicated in the tree representation of part (1), A, B, C and D. It may be seen by looking at the Reverse Polish form in part (2) of the example that the operators indicated by the letters D, C, B and A immediately following the operand groups, *g h, e f, c d,* and *a b* are the results indicated in the tree structure of part (1) and immediately relate to these groups and indicate that these operations can be performed immediately, i.e., in the time period $t_1$ as indicated by the tree of part (1). Still referring to the tree structure, it will be noted that operation E can only be performed in time $t_2$ and that similarly, operations F and G may be performed in times $t_3$ and $t_4$ respectively. It is readily apparent from examining the tree structure of part (1) that before operation E can be performed, the results of operations C and D must first be obtained. Similarly, before operation F may be performed, the results of operations B and E must first be obtained. And finally, before operation G may be performed, the results of operations F and A must be obtained. It will be seen that this information is readily available in the Reverse Polish notation of part (2) of the example in that when one comes to operation E, for example, it will be apparent that the immediately preceding operand is the result of operation C and that the next operand before that is the result of operation D. Thus, by examining the Reverse Polish notation form of the expression, the time period within which a given operation may be performed is determinable. Thus, operations A, B, C and D would all be performable in a first period of time, operation E in a second period of time, operation F in the third period of time and operation G in a fourth period of time. The most basic concept of the present invention provides a system for obtaining these just named levels which are indicative of the earliest times in which a given operation may be performed.

According to an additional aspect of the invention, the system is able to analyze and determine the latest possible time during which a given operation may be performed by analyzing the expression a second time. Referring again to Example I and specifically to the tree structure of part (1), it will be noted that although operation B may be performed in time $t_1$ that it could be performed in time $t_2$ and still not hold up the performance of operation F. Similarly, operation A may be performed in time $t_1$ but may be performed as late as time $t_3$ without interfering with or holding up the operation G in time $t_4$. In this second aspect of the invention, the system analyzes the Polish form and prepares a list of both the earliest and latest times in which specific operations called for in the algebraic expression may be performed. The manner in which this list is prepared and the way in which it is stored will be apparent from the following description of the specific illustrated embodiment of the invention and the additional examples which will be explained relative to the operation of said system.

Figure 1A:
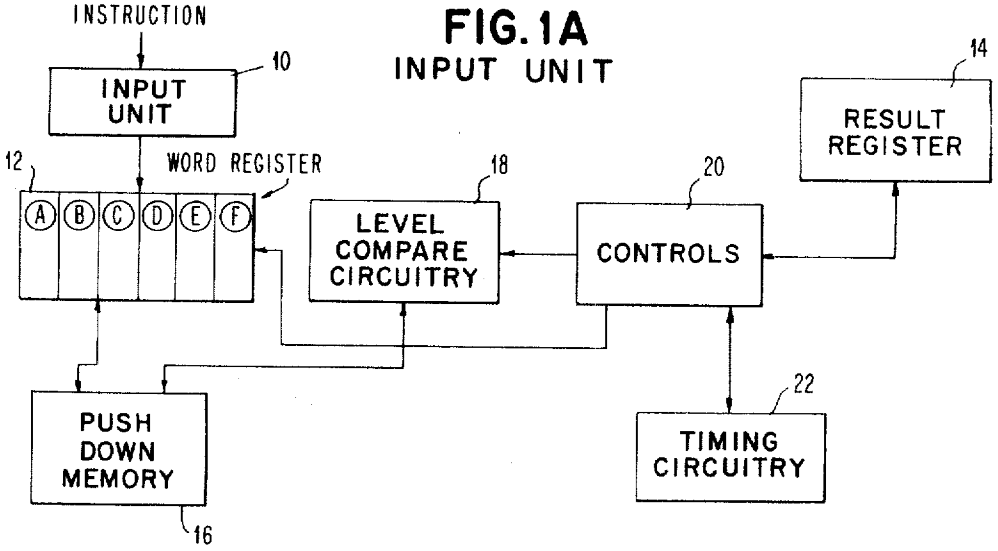
FIGURE 1A is a functional block diagram illustrating the major functional components of a preferred embodiment of the input portion of the system anticipated by the present invention.

Referring now to FIGURE 1A, there will be seen a block diagram of the input portion of the system capable of accepting an algebraic expression in Reverse Polish form, entering it into the system a character at a time, analyzing the expression and preparing a composite time sequence list indicating both the earliest and the latest times relative to the data access cycle, during which individual operations called for by the expression may be performed.

FIGURE 1 comprises a functional block diagram for the input portion of the system which receives the algebraic expression as a series of "characters." Each character is identifiable as either a memory address or an operation code, one of the operation codes being identifiable as the "end" instruction (::). The Input portion of the system loads the expression into a register bank and analyzes same to determine the parallel execution opportunities for said expression. The system includes the Input Unit 10 which is shown in detail in FIGURE 6 and essentially performs the steps of inputting a mathematical expression a character at a time from which point it is analyzed to determine whether a given character is "data," i.e., a memory address, an "operator" or the special operator "end." The block 10 further contains controls for inputting this information of the expression into the Word Register 12 such that the operators are stored in the A field indicated by the Ⓐ symbol and "data" address is stored in the Ⓑ field of said register, with a "0" inserted in the corresponding Ⓐ field. It will be apparent from the subsequent description of Example II that whenever an operator is stored in the Ⓐ field at a given address location, the address of a storage position in the Result Register 14 is automatically supplied by the Input Unit 10. In summation then, the Input Unit 10 initially loads the system with the raw input expression such that looking at the Ⓑ field of the Word Registers 12 in successive storage locations therein, the "data" or operands will appear or more specifically, the address in main memory of said operands and a result address corresponding to every operator symbol located in the associated position in the Ⓐ field of said Word Register 12. This may be more specifically seen by referring to the subsequent Example II, part (*d*), wherein it will be noted that in the Ⓑ column, the lower case letters represent the addresses in main memory of original operands and the upper case letters represent an address of a result operand in the Results Register for the related operator which appears in the Ⓐ field of said Word Register. Upon the occurrence and detection of an "end" symbol by the Input Unit 10, the proper controls are set whereby the subsequent analysis of the data is initiated.

The remainder of the circuitry in FIGURE 1A is for analyzing the algebraic expression currently stored in the Word Register 12 from the Input Unit 10 and serves the function of filling the remaining fields Ⓒ Ⓓ Ⓔ and Ⓕ of the Word Register 12. The fields Ⓒ Ⓓ and Ⓔ are filled during the "first pass" of the system which sequentially gates the data and result addresses from the Ⓑ field of the Word Register and concurrently tests the Ⓐ field of the Word Register to determine whether a given address is that of "data" or an "operator." Speaking in very general terms, as data is encountered, it is sequentially stored in the Push Down Memory 16 until an operator is encountered, at which point the last two data addresses stored in the Push Down Memory 16 are gated successively into field positions Ⓒ and Ⓓ of the Word Register at the word address therein corresponding to that wherein said operator was encountered. At the same time, the Result Register address stored in the Ⓑ field of the Word Register corresponding to that operator is inserted into the Push Down Memory together with a level count of "one" and stored in the Push Down Memory 16. In this fashion, the result address of the encountered operator is stored back in the Push Down Memory as the address of an operand available to be used with such subsequent operators as are encountered in the expression.

It should be noted at this time that all data encountered in the Ⓑ field of the Word Register 12 in this "first pass" causes a zero to be stored in the corresponding Ⓔ field of said Word Register as will be apparent from the more specific description of FIGURES 5A and 5B subsequently. As the "first pass" proceeds each time an operator is encountered, a level count will be generated for said operator and placed in the corresponding Ⓔ field of the Word Register 12.

The block labeled Level Compare Circuitry 18 is utilized in both the "first pass" and the "second pass" which latter step analyzes the level indicator stored in the Ⓔ field of the Word Register to determine the latest times in which a given operation may be performed. Again, the specific operation of the Level Compare Circuitry 18 will be apparent from the specific description of the logical diagram of FIGURES 5A and 5B. However, the general function of the Level Compare Circuitry is to compare the level counts for the two operands for a particular operator, determine which is the largest and gate said count to a subsequent counter which may be incremented or decremented as the particular controls require to insert the proper resultant level count in the Ⓔ and Ⓕ fields of the Results Register. The block 20 labeled Controls is intended to include the various gate circuits, counters, decoders and general logical circuitry included in the logical schematic of FIGURES 5A and 5B. This circuitry generally makes the various tests to determine the various branches which the system is to take. It provides the necessary control pulses to the timing circuitry of block 22. The timing circuitry is shown in further detail in FIGURES 4A and 4B which will be described more fully subsequently.

From the above description of FIGURE 1A, it may be seen that the input or analyzing operation of the present system is performed in three distinct steps.

First is the inputing operation during which the Ⓐ and Ⓑ fields of the Word Register 12 are filled;

Second is the "first pass" wherein the expression is evaluated character by character and a level count assigned to each operator in the Ⓔ field of said Word Register indicating the earliest relative time during which a particular operation may be performed and operand addresses (either "data" or results) are supplied to the Ⓒ and Ⓓ fields for each operation; and Third, the "second pass" wherein, beginning with the last position of the Ⓔ field, determination is made of the latest relative times during which given operations may be performed and said time stored in the Ⓕ field of said Word Register at the address related to that operation.

The first of the steps of the system, namely the inputing operation, in which the Ⓐ and Ⓑ fields of the Word Register are loaded have been generally described above and will be readily apparent from the more specific description of FIGURE 6 which will follow.

A description of the "first pass" may be more readily understood by referring to FIGURE 2 which is a flow chart for said "first pass." In describing FIGURE 2, occasional reference will be made to certain components of FIGURES 5A and 5B which may be referred to. It should perhaps be noted to make the description of FIGURE 2 more readily understandable that the Push Down Memory comprises two parts for any given storage location, the first or "address" portion will store the address for any piece of data indicated by the Ⓑ field of the Word Register 12 which is either an address in the Results Register or a main memory address. The second portion of each memory storage location of said Push Down Memory is utilized for storing a "level count" which, as will be apparent from subsequent descriptions, comprises either the earliest or the latest times during which an operation may be performed. Suitable controls are provided to analyze or read out the address portion of any word stored in the Push Down Memory or conversely, the level count stored in any particular storage location in said memory together with a related address.

Proceeding now with the description of FIGURE 2, it will be noted that in the upper right hand corner of each block, a number appears which will be characteristic of each block in this figure and is utilized in the present description for convenience of explanation. Each of the blocks represents a step or plurality of steps which are performed by the control circuitry and timing circuitry in cooperation with the rest of the system to perform the various operations required. Block 1, which states, "set word select control to one" is initiated by CL–1 of the timing circuit when an "end" symbol is encountered at the termination of the input run. In other words, the occurrence of an input to block 1 indicates that the input expression has been completely stored in the Ⓐ and Ⓑ fields of the Word Register 12 and the system is now ready to start analyzing said expression. The function of this first block is to set the Word Select Control 62 (FIGURE 5B) of the Word Register 12 to its first storage location or in other words, to evaluate the first character of the expression. Proceeding to block 2, this block tests the Ⓐ field of the particular word in the Word Register on which the Word Select Control is currently sitting. This block determines whether the character stored therein is an "end," "operator" or "data." Assuming first that the particular character sensed in the Ⓐ field of the Word Register is "data," the system goes to block 3. This block effects the gating of the selected Ⓑ field of the Word Register into the Push Down Input Register 16 address field. In other words, it gates the address stored in the current Ⓑ field of the Word Register into the address field of the Push Down Input Register. Concurrently, with block 3, block 4 resets the Push Down Input Register level count to zero. In other words, at the end of steps 3 and 4, an address (of data) is in the address field of the Push Down Input Register and the level count "zero" is in the level count section of the Push Down Input Register. The next step is block 5 which causes a push down cycle and thus stores the current information in the Push Down Input Register to be stored into the upper storage location of the Push Down Memory. Block 6 advances the Word Select Control by "one" and thus selects the next consecutive word in the Word Register 12. Proceeding then again to block 2, where the Ⓐ field of the Word Register is again read, it will now be assumed that an "operator" is detected in the Ⓐ field. In this case, the system proceeds to block 7. This block causes the address fields stored in positions 1 and 2 of the Push Down Memory 16 to be gated sequentially into fields Ⓒ and Ⓔ of the Word Register at the particular word location of the Word Register on which the operator was detected. Concurrently, with block 7, block 8 is energized which causes the numbers stored in the respective level count fields of positions 1 and 2 of the Push Down Memory 16 to be gated into the Level Compare Circuitry. The Level Compare Circuitry determines which of the level counts is largest and gates the same into the Level Counter 74 upon the occurrence of block 9. This block causes the number "1" to be added to the larger of the two values in the level count fields of positions 1 and 2 of the Push Down Memory on the current operation and in turn, in block 10 causes this incremented number to be stored in the Ⓔ field of the Word Register and also the count field of the Push Down Input Register. Proceeding then to block 11, the Ⓑ field of the Word Register on which the word such control is currently sitting is gated into the Push Down Input Register address field and the system proceeds to block 12 which causes a push up of two positions in the Push Down Memory without affecting the Push Down Input Register and then proceeds back to block 5 which initiates a push down cycle.

What the system has just done, upon the occurrence of an operator, is gated the addresses of the last two operands encountered in the system whether they be raw data or results and has compared the level count of both operands and determined the largest. Thus, if the largest level count were, for example, four, it is apparent that this operand would not be obtainable until the fourth time cycle for the current algebraic expression.

Accordingly, an operator using the result of an operation which was performed in number four time could not possibly be performed until five time. Thus, the number four is detected and incremented by one. Therefore, the address of the result for this operand together with the number five would be stored in the Push Down Memory 16. The system then returns to block 6 wherein the Word Select Control again advances to the next position of the Word Register 12. And subsequently to block 2 wherein the Ⓐ field is again tested and this time, it will be assumed that an "end" symbol is encountered. The occurrence of this "end" symbol causes the system to branch to the third portion of the input cycle or the "second pass."

The "second pass" is illustrated in the flow chart of FIGURE 3. The format of FIGURE 3 is identical to FIGURE 2 in that the number of the steps in this figure appear in the upper right hand corner and these blocks will be referred to by this number for sake of convenience.

As stated above, the occurrence of an "end" symbol in the Ⓐ field of the Word Register causes block 1 of FIGURE 3 to be actuated. This block sets the "*t*" flip-flop of the logical circuitry shown in FIGURE 5 to a "0." It will be remembered that at the end of the first pass, the Word Select Control is sitting in the position of the Word Register containing the "end" character from the instruction. Therefore, the system must sequentially proceed back to the beginning of the expression during the "second pass." Accordingly, on block 2, the Word Select Control is decremented by one. Subsequent to this decrementing, the setting of the Word Select Control is tested. If the Word Select Control is sitting at its zero address, this would mean that the "second pass" was completed and that the system is ready to start supplying the instructions to the multiprocessor computer system. If on the other hand, the Word Select Control is not on zero, the system proceeds to block 3. In this step, the number currently appearing in the level count field of the Push Down Input Register is gated into the Ⓕ field of the Word Register. After this operation, the test is made to see if the current contents of the Ⓐ field of the Word Register contains a zero, i.e., the Ⓑ field contains a data address, and also checks to see if the F.F. "*t*" is set to a "1." Assuming first that this condition exists, the system proceeds to block 3A which resets F.F. "*t*" to a "0" and goes back to block 2. It should perhaps be stated at this time that the setting of the flip-flop "*t*" to a "1" occurs when the current Ⓐ field of the Word Register being examined is found to contain an operator. If the flip-flop "*t*" is already set to "1" due to a just examined "operator," it, of course, will remain in its "1" state. It will be noted that reference is again made to Example II wherein the contents of the Push Down Memory on the "second pass" are illustrated. It will be noted in this example that an indication appears in the particular step columns when the flip-flop "*t*" is set to a "1" or set to a "0." The setting of the flip-flop to its "1" state causes the Push Down Memory to start loading on subsequent operations until a data character is again encountered. Conversely, when the flip-flop is set to its "0" state, the memory starts reading out until an operator is again encountered.

Returning now again to the block diagram of FIGURE 3, assuming that the system is currently sitting on block 3 and an operator is found to be contained in the Ⓐ field of the register being examined, a push up cycle of the Push Down Memory is initiated, gating the next word stored in said memory into the Push Down Input Register. This step is, of course, block 4. Since this position of the Word Register contains an "operator," the system proceeds to block 5 wherein the count in the level count field of the Push Down Input Register is gated to the Level Counter. In block 6, the Level Counter is decremented by one. Assuming that the flip-flop "*t*" is currently sitting in its "0" position, the system proceeds to block 7 wherein the contents of the Level Counter are gated into the level count field of the Push Down Input Register. If the flip-flop "*t*" had been set to a "1," the system would have proceeded through block 8 which would have first stored the previous level count in the level count field in the Push Down Memory through a push down cycle before gating the new level count field from the Level Counter into the Push Down Input Register. The system then proceeds to block 8 which initiates the second push down cycle. If the flip-flop "*t*" is currently set to a "0," the system proceeds to block 9 which sets the flip-flop to a "1" and returns again to block 2. If on the other hand the flip-flop had already been set to a "1," the system would have returned directly to block 2 bypassing block 9. Thus, it may be seen that whenever an operator is detected in the Ⓐ field being examined, the flip-flop "*t*" will also be set to its "1" state unless, of course, it is already in such state.

Assuming the condition now wherein the Ⓐ field of the Word Register is found to correspond to "data" and F.F. "*t*" is sitting on "0," the system controls proceed directly out of block 4 back to block 2. Thus, in this case, when a sequence of "data" designators is encountered, the contents of the Push Down Memory are merely gated up and the level count in the top most position of the memory of the just preceding character is stored in the Ⓕ field in the Word Register for the subsequent character.

It will be seen from the description of the flow chart of FIGURE 3 for the "second pass" of the system, that this pass begins with the highest time level as determined from the "first pass" and determines the latest relative times during which each previous operation may be performed commensurate with this highest level determination from said "first pass." The advantages of performing this "second pass" will be apparent from the subsequent description of Example III wherein a multiprocessor system may more advantageously be assigned various jobs if both of these passes are made rather than the "first pass" only.

Referring now to FIGURES 4A and 4B, the timing control of the system will now be explained generally. It will be apparent from the figure that each of the individual clock segments of the timing controls comprise a single shot multivibrator having a first output or timing pulse as the clock stage is energized and having a second or output pulse when the timing stage goes off. Such timing clocks in themselves are well known and may be found in any number of reference texts including the two Richards' books set forth previously. Single shots S.S. 1–S.S. 3 comprise the input timing section whereby an algebraic expression is input into the system a character at a time until the end of said expression is detected and clock stage S.S. 4 is initiated. It will be noted that the necessary branching by the input clock is obtained from the outputs of the Instruction Register Decoder being "ANDed" with the turn off pulse of single shot 1 and AND gates 30, 32 and 34. Depending on which of these gates is energized, it is apparent that access to S.S. 2, S.S. 3 or S.S. 4 will be initiated.

The energization of S.S. 4 initiates the "first pass." The turn off of S.S. 5 in conjunction with the output of the Word Select Decoder determines the major branch point for the "first pass."

The turn off pulse from S.S. 5 is ANDed with any of the three outputs from the Word Select Decoder 64 in AND circuits 36, 38 and 40 depending on the particular output from said decoder. In the event that an "operator" is detected in the Ⓐ field, AND circuit 38 would be energized which initiates the clock sequence beginning with S.S. 6–S.S. 11. If a "data" character were detected, AND circuit 38 would be energized, thus taking the sequence directly to S.S. 12 through OR gate 42. If the "end" symbol is detected, AND circuit 40 is energized, taking the system directly to S.S. 14 which begins the timing sequence controls for the "second pass."

The "second pass" timing controls, i.e., S.S. 14–S.S. 24 appear in FIGURE 4B. A number of branching points are readily apparent in this figure, for example, when the output of S.S. 15 goes off, it is ANDed with the zero position of the Word Select Control to determine whether said control is sitting in its zero or some other position and this determines whether the "second pass" is terminated or whether S.S. 16 is to be next energized. Similarly, the turn off pulse of S.S. 16 is ANDed with the output from AND circuit 70 of FIGURE 5B to determine whether the Ⓐ field of the Word Register contains "zero" and F.F. "*t*" is set to a "1." The outputs of S.S. 18, S.S. 20 and S.S. 23 are similarly checked against either the output of the flip-flop "*t*" or the output of the Word Selector Decoder to determine whether an "operator" or "data" is present. It will be apparent to anyone skilled in the art that these branching points of the timing controls are those illustrated in the diagrams of FIGURES 2 and 3 and the various tests determine the direction in which the timing sequence for a given instruction is to go.

Before going into the logical diagram of FIGURE 5, the input portion of the system which actually performs the function of inputing the algebraic expression into the proper Ⓐ and Ⓑ fields of the Word Register will be briefly described. This circuitry includes the Instruction Register 50 which receives an input algebraic expression a character at a time. The characters are put into this register in an essentially synchronous manner, in other words, with a given time spacing and each time a character is received in the Instruction Register, a character received signal is provided which goes to S.S. 1 through the Delay Unit 52 (see FIGURE 4A). The "R" line going into the Instruction Register as in all of the other logical circuitry where such an input is indicated such as numerous flip-flops in the output section, indicate a "reset" pulse which is applied to the system whenever power is first turned on to make sure that everything is reset to its zero state. It will be noted that the output of the Instruction Register goes to the IR Decoder or Instruction Register Decoder 54 which provides an output on one of three lines depending whether an "operator," "end" or "data" character is currently in the Instruction Register. The other significant block of the input section is the Results Register Select Counter 56 which is, in effect, an address generator which assigns the results of various operations to specific storage locations within the Results Register. This counter could alternatively assign storage locations in main memory rather than in a special register bank. The specific details of the other logic circuitry will be explained sequentially with reference to the Timing Sequence Chart which will be set forth subsequently.

The more significant portion of FIGURES 5A and 5B will now be explained, it being noted that all of the controls will be specifically described with reference to the description of the Timing Sequence Chart related to this figure which will follow subsequently. The Word Register 12 comprises the actual Storage Register 60 and the Word Select Control 62 which latter unit addresses a particular word location of the storage register 60. It will be noted that the Storage Register 60 has six storage bins for each location which have been called the Ⓐ, Ⓑ, Ⓒ, Ⓓ, Ⓔ and Ⓕ fields. It is in this register that the results of the input portion of the present system are stored as the system is proceeding with the analysis of a given algebraic expression and, also, it is the contents of this register that are ultimately utilized by the Output Unit. It will be noted that the Ⓐ field stores the operation code or an indication of whether a given character of an input expression represents either "data," an "operator" or an "end" symbol. The Ⓑ field contains addresses either of data or of the Results Registers location where the result of a particular operation is to be stored. The Ⓒ and Ⓓ fields contain addresses again of either data or results. However, it is to be noted that these two fields contain the addresses of the operands for the particular operation which is stored in the Ⓐ field for the word on which the Word Select Control is currently set.

The Ⓔ field, as stated previously, stores the earliest relative time during which the operation specified by the Ⓐ field may be performed and the Ⓕ field stores an indication of the latest relative time during which said operation may be performed. The Word Select Control 62 is essentially a counter having a plurality of outputs which can be incremented or decremented by suitable controls. This counter has as many positions as there are word storage locations in the Storage Register and also a zero position which is utilized as was described previously to determine when the "second pass" has terminated. The Word Select Decoder 64 performs much the same function as the IR Decoder 54 just described with reference to FIGURE 6. In other words, it provides an indication as to whether there is an "operator," "data" or an "end" symbol store in the Ⓐ field of the Word Register. It will be noted in Example II that the operation code for data is zero which indicates that there is no operator in this location. The Word Select Decoder 64 detects this condition by providing an output on the appropriate "data" line. The flip-flop "*t*" has been described previously and is utilized to change the cycles f the Push Down Memory when an "operator" is detected uring the "second pass."

The Push Down Memory block 16 of FIGURE 1 essenially contains two units, the Memory itself 66 and the 'ush Down Input Register 68. As described previously, he Memory and the Input Register have essentially two ections in any given word storage location, i.e., one half s the address of a data storage location for particular perands and the other half a level count position in vhich the time at which such operand may become availble is stored. It is the use of this Push Down Memory vhich allows the temporary storage and recall of the lata when analyzing the various operands of the Polish notation as was explained previously.

The two Compare Registers 68 and 70 are utilized to tore the level counts of two consecutive operands gated out of the Push Down Memory and which are related o a particular "operator" currently being examined by he system. The two numbers in these registers are actually compared in the Compare Circuit 72 which provides a signal on one of its two outputs depending on which of said numbers is greater. These two outputs are utilized with logic circuitry which will be explained subsequently with reference to the Timing Sequence Chart to gate the arger of said two numbers into the level counter 74 n which this number may be incremented or decremented depending upon whether the "first pass" or the "second pass" of the system is currently in process. As stated previously with regard to FIGURE 6, the remainder of the circuitry in the logical schematic diagram of FIGURE 5 consists of conventional gate circuits, AND circuits, OR circuits and invert circuits and the function of the majority of these will be specifically enumerated with further reference to the Timing Sequence Chart. The operation of any of these logical blocks which is not specifically referred to is thought to be patently obvious to a person skilled in the art.

The following is a Timing Sequence Chart for the input section of this system wherein the functions performed by each of the clock stages CL–1–CL–24 is specifically set forth and described.

*Timing sequence chart*

"Character Received" signal turns on CL–1 through Delay Unit

CL–1
- Reset Word Select Control to "1"
- Reset Word Register to "0"
- Reset Result Register Select Counter to "1"
- If character is "data":
- Gate character to Ⓑ field of Word Register
- Go to CL–3
- If character is "operator":
- Gate character Ⓐ field of Word Register
- Gate available address of Result Register Select Counter to the Ⓑ field of the word Register
- Go to CL–2
- If character is "end" symbol:
- Gate character to Ⓐ field of Word Register
- Go to CL–4 (next phase)

CL–2
- Step Result Register Select Counter +1
- Go to CL–3

CL–3
- Step Word Select Control +1
- Reset Input Register to "0"

Read In
First Pass

CL–4
- Set Word Select Control to "1"
- Go to CL–5

CL–5
- If content of Ⓐ field of Word Register is "data":
  - Gate Ⓑ field of Word Register to address field of Push Down Input Register
  - Set Level count field of Push Down Input Register to "0"
  - Go to CL–12
- If contents of Ⓐ field of Word Register is "end":
  - Go to CL–14
- If Ⓐ=operator:
  - Gate address field of Psh Down Input Register to Ⓒ field of current word
  - Gate level count field of Push Down Input Register to Compare Register #1
  - Go to CL–6

CL–6
- Push up Push Down Memory
- Go to CL–7

CL–7
- Push up Push Down Memory
- Go to CL–8

CL–8
- Gate address field of Push Down Input Register to Ⓓ field of Word Register
- Gate level count field of Push Down Input Register to Compare Register #2
- Go to CL–9

CL–9
- Gate greater of Compare Register #1 or Compare Register #2 to the Level Counter
- Go to CL–10

CL–10
- Add "1" to the Level Counter
- Go to CL–11

CL–11
- Gate Ⓑ field of Word Register to address field of Push down Input Register
- Gate contents of Level Counter to count field of Push Down Input Register of Word Register and into Ⓔ field
- Go to CL–12

CL–12
- Push down Push Down Memory
- Go to CL–13

CL–13
- Advance Word Select Control "+1"
- Go to CL–5

Second Pass

CL–14
- Set "*t*" flip-flop=0

CL–15
- Go to CL–15
- Step Word Select Control "−1"
- "next phase" or initiate "performance" cycle if Word Select Control is on "0"
- Go to CL–16 if Word Select Control is not "0"

CL–16
- Gate level count field of Push Down Input Register into the Ⓕ field of Word Register
- Go to CL–17 if the Ⓐ field of the Word Register contains "data" and flip-flop "*t*" is set to a "1"
- Go to CL–18 if the condition (the Ⓐ field of the Word Register contains "data" and flip-flop "*t*" is set to a "1") is not met CL–17
- Set flip-flop "*t*" to "0"
- Go to CL–15

CL–18
- Push up Push Down Memory
- Go to CL–15 if Ⓐ field of Word Register contains "data"
- Go to CL–19 if Ⓐ field of Word Register contains "operator"

CL–19
- Gate level count field of Push Down Input Register to Level Counter
- Go to CL–20

CL–20
- Subtract "1" from Level Counter

Go to CL–21 if flip-flop "*t*" is on "1"
Go to CL–22 if flip-flop "*t*" is on "0"

CL–21
Push down Push Down Memory
Go to CL–22

CL–22
Gate Level Counter to level count field of Push Down Input Register
Go to CL–23

CL–23
Push down Push Down Memory
Go to CL–24 if flip-flop "*t*" is on "0"
Go to CL–15 if flip-flop "*t*" is on "1"

CL–24
Set flip-flop "*t*" to "1"
Go to CL–15

The specific operations of the logical schematic diagrams of FIGURES 5 and 6 will now be set forth and described with reference to the above Timing Sequence Chart. The description of the first three clock stages will refer primarily to FIGURE 6.

Referring now to the specific details of operation of the system going completely through the Timing Sequence Chart when an algebraic expression is received or the first character thereof is received in the Instruction Register 50, a signal is provided on line 51 which initiates S.S. 1 through Delay Circuit 52. The output of Delay Circuit 52 turns on S.S. 1. S.S. 1 resets the Word Select Control 62 to its one address and resets all of the Word Registers to zero and also, the Results Register Select Counter 56 to its zero or initialized position. The IR Decoder 54 analyzes the character in the Instruction Register 50 and if the character is "data," the "data" line is activated and this line is ANDed with the clock pulse 1 through AND circuit 76 which actuates gate 78 to gate the character into the Ⓑ field of the Word Register. If the character in the Instruction Register 50 had been an "end" symbol, it would have been ANDed through AND circuit 80 with CL–1 and its signal passed through OR 82 and gate 84 to gate said symbol into the Ⓐ field of the Word Registers. If an "operator" had been detected, the operator line would have been actuated and AND circuit 86 would have caused gate 84 to gate said operator into the proper Ⓐ field of the Word Register and also, the current address setting of the Results Register Select Counter 56 would have been gated through gate circuit 88 and OR circuit 90 into the Ⓑ field of the Word Register. Assuming further that the character is an "operator," AND circuit 30 of FIGURE 4A would be energized and clock stage 2 would come up. The output of clock stage 2 causes the Results Register Select Counter 56 to be incremented by one and proceeds to clock stage 3. Clock stage 3 steps the Word Select Control by one and resets the Input Register to zero and causes read in of the next character. This process will be repeated with data being gated into the Ⓑ field of the Word Register and operators and addresses from the Results Register Select Counter to the Ⓑ field of the Word Register until all of the expression is read into the system and an "end" symbol is finally detected. Occurrence of this "end" symbol causes clock stage 4 to be initiated.

Clock stage 4 begins the "first pass" of this system, during which it is determined the earliest relative time during which any given operation called for by the mathematical expression may be performed. During this timing sequence, the Ⓒ and Ⓓ registers are also filled. As stated previously, the occurrence of an "end" symbol initiated clock stage 4, the output of which sets the Word Select Control 62 to the first storage location of the Word Register. The turn off of S.S. 4 turns on the fifth clock stage. The output pulse of S.S. 5 tests to see whether the "operator," "data" or the "end" line of the Word Select Decoder 64 is up. First, assuming that a "data" symbol is detected by the Word Select Decoder 64, AND circuit 92 will cause the resetting of the level count portion of Input Register 68 to a zero. The output of AND circuit 92 passing through OR circuit 94 also gates the address of said data into the Ⓑ field of the Word Register through gate 96 into the address portion of the Push Down Input Register 68. The turn off of S.S. 5 in this instance initiates clock stage 12. Clock stage 12 initiates a push down cycle for the Push Down Memory 66 and stores in the number one word location the combination word currently stored in the Push Down Input Register 68. The turn off of S.S. 12 initiates clock stage 13. Clock pulse CL–13 causes the Word Select Control 62 to be incremented by one and thus looks at the next word location in the Word Register 12. The turn off of S.S. 13 passing back through OR circuit 98 reactuates clock stage 5. This time assuming that an "operator" is detected by the Word Select Decoder 64, CL–5 will actuate AND circuit 100 which will gate the address portion of the word in the Push Down Input Register 68 into the Ⓒ field of the Storage Register 60 through gate 102. The output of AND circuit 100 will also gate the level count in Push Down Input Register 68 through gate 102 into one of the Compare Registers 69. The turn off of S.S. 5 in this case proceeds through to the sixth clock stage. The turn on of S.S. 6 causes the Push Down Memory 66 to be pushed up one position and the turn off takes the clock to clock stage 7. Turn on of S.S. 7 causes a second pushing up of the Push Down Memory 66 and the turn off activates clock stage 8. The turn on of S.S. 8 gates the address in Push Down Input Register 68 through gate 104 into the Ⓓ register and likewise, gates the level count from the level count field of the Push Down Input Register 68 into the others of the Compare Registers 70 through gate 106. The turn off of S.S. 8 turns on S.S. 9. The turn on of S.S. 9 gates the greater of the numbers in the Compare Register 69 and 70 through AND circuits 108 or 109 and their respective gates 110 and 111 through OR circuit 112 into the Level Counter 74. The turn off of S.S. 9 initiates the tenth clock cycle. S.S. 10 causes the Level Counter 74 to be incremented by one and then activates clock stage 11. Clock stage 11 through OR circuit 94 gates the Ⓑ field of the Word Register through gate 96 into the address field of the Push Down Input Register 68. This clock cycle also gates the contents of the Level Counter 74 through gate circuit 114 into the Ⓔ field of the Word Register and also into the level count field of the Push Down Input Register 68 through OR circuit 116. The turn off of S.S. 11 initiates clock stage 12.

Clock stage 12 initiates a push down cycle of the Push Down Memory 66 and on turning off, actuates S.S. 13. S.S. 13 advances the Word Select Control 62 by one and returns to re-actuate S.S. 5 through OR circuit 98.

The last condition which clock stage 5 will detect is an "end" symbol in the Ⓐ field of the Word Register. When this occurs, the clock circuit branches to S.S. 14 through AND gate 40. Clock stage 14 is the first cycle of the "second pass." Clock 14 sets flip-flop "*t*" to a "0" and turns on S.S. 15. S.S. 15 decrements the Word Select Control 62 by one or in the minus (−) direction. The turn off of S.S. 15 tests the setting of the Word Select Control for a zero through AND circuits 120 and 122. If the AND circuit 122 is actuated, it means that the "second pass" is completed and that the system is ready to perform the called for operation. If, however, the AND circuit 120 is actuated, S.S. 16 will be actuated. The turn on of S.S. 16 gates the level count field of the Push Down Input Register into the Ⓕ field of the Word Register 60 through gate 124. At this point it will be noted in FIGURE 5B that AND circuit 70 tests the condition defined by: the Ⓐ field of the Word contains "data" and the "*t*" flip-flop is set to a "0." An output on line 71 indicates that this condition is met. The turn off of S.S. 16 tests the condition of line 71. If it is off, the invert circuit 126 actuates AND circuit 128 to take the system to clock stage 18. The turn on of S.S. 18 initiates a push up of the Push Down Memory 66. The turn off of S.S. 18 tests to see if the Ⓐ field of the Word Register 60 contains "data" or an "operator." If the Ⓐ field contains an "operator," the clock continues to clock stage 19. It will be noted that this test is made in AND circuits 130 and 132 which directly follow S.S. 18 in FIGURE 4C. The actuation of S.S. 19 causes the level count field of the Push Down Input Register 68 to be gated to the Level Counter through gate 134 and OR circuit 112. The turn off of S.S. 19 turns on S.S. 20. The turn on of S.S. 20 subtracts one from the Level Counter 74. The turn off of S.S. 20 tests the condition of F.F. "*t*." If the F.F. "*t*" is on a "1," AND circuit 136 is energized and this system proceeds through S.S. 21 or if the F.F. "*t*" is "0," AND circuit 138 will be energized and the system proceeds through OR circuit 140 to S.S. 22. Assuming that the F.F. "*t*" is on "1," clock stage 21 is actuated. The turn on of S.S. 21 initiates a push down cycle of the Push Down Memory and on turn off proceeds through OR circuit 140 to clock stage 22. The turn on of S.S. 22 gates the Level Counter 74 through gate 142 and OR circuit 116 into the level count portion of the Push Down Input Register 66 and on turn off, actuates S.S. 23. S.S. 23 causes a push down cycle of the Push Down Memory 66 and on turning off, again tests to see if F.F. "*t*" is on a "0" or a "1" through AND circuits 144 and 146. If the F.F. "*t*" is on "1," the system reverts directly back to clock stage 15 and if flip-flop "*t*" is on "0," clock stage 24 is actuated through AND circuit 144. The turn on of S.S. 24 sets the F.F. "*t*" to a "1" and on turning off, sends its output pulse through OR circuit 148 and returns to clock stage 15.

The above description of the logical block diagram of FIGURES 5A and 5B and also, FIGURES 4A, 4B, 4C and FIGURE 6 with the reference to the Timing Sequence Chart is believed to clearly explain all of the operations of the present system in inputing data to the system and analyzing same on the "first pass" and "second pass" runs. As stated previously, the circuitry is so interrelated that it is necessary to examine FIGURES 4, 5 and 6 concurrently when analyzing the operation of the system through said Timing Sequence Chart.

The following description of Example II is intended to provide a visual illustration of the contents of the Word Register and the Push Down Memory 66 during sequential steps of the system in analyzing a specific problem.

EXAMPLE II (a) [a * (b * (c + c))] * [e * (f * (g + h))]

(b)
```
        A B C        D E F G
        | | |        | | | |
a b c d + * * e f g h + * * * : :
```

(c)

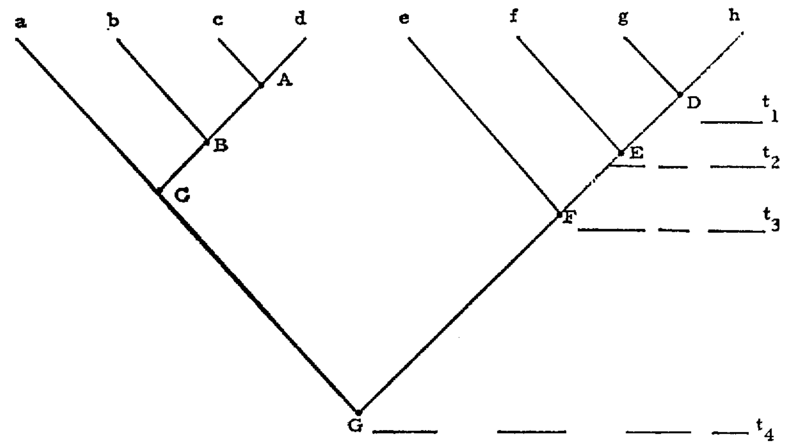

CONTENTS OF WORD REGISTER

| Position of Word Select Control | Op. Code (A) | Addresses (B) | Data Addresses (C) | Data Addresses (D) | Lowest Level (E) | Highest Level (F) |
|---|---|---|---|---|---|---|
| ① | ---------- | a | ---------- | ---------- | 0 | 2 |
| ② | ---------- | b | ---------- | ---------- | 0 | 1 |
| ③ | ---------- | c | ---------- | ---------- | 0 | 0 |
| ④ | ---------- | d | ---------- | ---------- | 0 | 0 |
| ⑤ | + | A | d | c | 1 | 1 |
| ⑥ | * | B | A | b | 2 | 2 |
| ⑦ | * | C | B | a | 3 | 3 |
| ⑧ | ---------- | e | ---------- | ---------- | 0 | 2 |
| ⑨ | ---------- | f | ---------- | ---------- | 0 | 1 |
| ⑩ | ---------- | g | ---------- | ---------- | 0 | 0 |
| ⑪ | ---------- | h | ---------- | ---------- | 0 | 0 |
| ⑫ | + | D | h | G | 1 | 1 |
| ⑬ | * | E | D | f | 2 | 2 |
| ⑭ | * | F | E | e | 3 | 3 |
| ⑮ | * | G | F | C | 4 | 4 |
| ⑯ | END | | Scan Down | | | Scan Up |
| Load Run | | | First Pass | | | Second Pass |

CONTENTS OF PUSH DOWN MEMORY—"FIRST PASS"

| Setting of Word Select Control | | | | | | | | | | | | | | |
|---|---|---|---|---|---|---|---|---|---|---|---|---|---|---|
| ① | ② | ③ | ④ | ⑤ | ⑥ | ⑦ | ⑧ | ⑨ | ⑩ | ⑪ | ⑫ | ⑬ | ⑭ | ⑮ |
| Character in Expression | | | | | | | | | | | | | | |
| (a) | (b) | (c) | (d) | (+) | (*) | (*) | (e) | (f) | (g) | (h) | (+) | (*) | (*) | (*) |
| a 0 | b 0 | c 0 | d 0 | A 1 | B 2 | C 3 | e 0 | f 0 | g 0 | h 0 | D 1 | E 2 | F 3 | G 4 |
| | a 0 | b 0 | c 0 | b 0 | a 0 | | C 3 | e 0 | f 0 | g 0 | f 0 | e 0 | C 3 | |
| | | a 0 | b 0 | a 0 | | | | C 3 | e 0 | f 0 | e 0 | C 3 | | |
| | | | a 0 | | | | | | | e 0 | | | | |
| | | | | | | | | | C 3 | C 3 | C 3 | | | |

(e)

CONTENTS OF PUSH DOWN MEMORY DURING SECOND PASS

| Setting of Word Select Control | | | | | | | | | | | | | | | |
|---|---|---|---|---|---|---|---|---|---|---|---|---|---|---|---|
| ⑯ | ⑮ | ⑭ | ⑬ | ⑫ | ⑪ | ⑩ | ⑨ | ⑧ | ⑦ | ⑥ | ⑤ | ④ | ③ | ② | ① |
| Instruction Character Being Examined | | | | | | | | | | | | | | | |
| Start | (*) | (*) | (*) | (+) | (h) | (g) | (f) | (e) | (*) | (*) | (+) | (d) | (c) | (b) | (a) |
| | Set t=1 | | | | Set t=0 | | | | Set t=1 | | | Set t=0 | | | |
| G 4 | 3 | 2 | 1 | 0 | 0 | 1 | 2 | 3 | 2 | 1 | 0 | 0 | 1 | 2 | |
| | | 3 | 2 | 1 | 1 | 2 | 3 | | | 2 | 1 | 1 | 2 | | |
| | | | 3 | 2 | 2 | 3 | | | | | 2 | 2 | | | |
| | | | | 3 | 3 | | | | | | | | | | |

(f)

It will be noted that the above example is arranged in six sections, (a), (b), (c), (d), (e) and (f). Section (a) is a typical algebraic expression written in standard parentheses containing form which is to be analyzed by the present system. Section (b) is this same expression written in Reverse Polish notation. Section (c) is the above expression shown as a tree structure which as explained previously with reference to Example I, clearly indicates the opportunities for parallel operation or performance in any mathematical expression. Section (d) illustrates the contents of the Word Register 60 after the algebraic expression of section (b) had been input to the system and completely analyzed by the system. It will be noted in section (d) that the first column represents the setting of the Word Select Control or the particular word of the Word Register which is being looked at by the system in any given time. Also, the Ⓐ–Ⓕ fields are illustrated as well as the definition of their contents. At the bottom of the figure, the brackets denote the fact that Ⓐ and Ⓑ fields are loaded on the first run and similarly, the loading of the Ⓒ, Ⓓ and Ⓔ fields is indicated to occur on the "first pass," and the loading of the Ⓕ field on the "second pass."

Sections (e) and (f) of Example II illustrate the contents of the Push Down Memory 66 during the "first pass" and the "second pass." Referring to the table of section (e), the "first pass," it will be noted that the upper row of numbers indicates the setting of the Word Select Control during the particular cycle. The second row indicates the particular character of the input expression which is being analyzed by the system in any given time stage and the rest of each of the columns indicates the actual contents of the Push Down Memory.

The table of section (f) of FIGURE 2 for the "second pass" is arranged quite similarly to section (e). The upper row being the setting of the Word Select Control for the particular contents of the Push Down Memory being analyzed in any given time cycle. The second row indicates the character of the input expression being currently analyzed during that particular time cycle and the remainder of the column indicates the contents of the Push Down Memory. It will be noted in section (f) that the Push Down Memory is only indicated as storing a single column of numbers, i.e., level counts. This is because, as will be remembered from the previous description only the level counts are considered in the "second pass." It is believed that sections (a) through (d) are self-explanatory, however, it should perhaps be pointed out with respect to the tree diagram of section (c) that the relative times during which the various operations may be performed are illustrated by the horizontal lines labaled $t_0$–$t_4$. Relating this tree diagram now to section (d), it will be noted that the operation indicated by the results A and D on line $t_1$, indicate that this operation may be performed at time 1. Referring now to section (d), the lowest level or Ⓔ field entry for the A and D in column Ⓑ indicate a 1 time. The same correlation holds true for operations B and E which are shown to be performable in time $t_2$ in section (c) and also in time 2 in Ⓔ field of section (d). It may thus be seen that the results stored in the Word Register as illustrated in section (d) clearly illustrates the capabilities of the system insofar as determinating proper time sequences for performance of operations.

Referring now to section (e), the operation of the system on the "first pass" will be explained generally with reference to this table. In step ① which indicates the setting of the Word Select Control and is the upper row of figures in this figure, the data character or operand, *a*, is detected. Since this is a data character, it is stored in the first position of the Push Down Memory with the level count zero. On step ②, another data character, *b*, is detected and this together with its level count of zero is stored in the Push Down Memory. The same procedure continues through step ③ and step ④ until at the end of step ④, the four data characters, *a, b, c* and *d*, together with their level count indicators of zero are stored in the memory. On step ⑤, an operator is detected and the two upper most operands stored in the push down store, i.e. *d* and *c*, are gated into the fifth storage location of the Word Register Ⓒ and Ⓓ fields. The largest of the two level counts (zero for both) is incremented by one, and this "1" is stored in the Ⓔ field and the result address, A, together with the level count one re-entered in the Push Down Register in the upper most position.

On step ⑥, the same thing occurs as with ⑤, with the exception that the upper most character in the register is now the A having a level count of one. When this level count of one and the level count for *b* of zero is compared, it will be found that the one is larger, which one is incremented by one and is entered as a two in the Ⓔ field of word position ⑥ of the Word Register. The operands A and *b* are also stored in Ⓒ and Ⓓ fields for this word location. And the subsequent B and level count of two placed back in the upper storage location of the Push Down Memory. Step ⑦ is identical with step ⑥ with the exception that the new information goes into the ⑦ word location of the Word Register.

On step ⑧, a data symbol is again encountered and its address, *e*, together with a level count of zero is accordingly entered into the upper position of the Push Down Memory, Steps ⑨, ⑩ and ⑪ are identical with the step ⑧ just described. Upon the detection of an operator in step ⑫, the system starts gating data out of the Push Down Memory in a manner identical with step ⑤ described above until on step ⑯, an "end" symbol is detected which shifts control to the "second pass."

It will be noted from the above description of section (e) that the operation of the invention is clearly apparent. While utilizing the push down store with a grouped form of notation, it is possible to gate out groups of operands, i.e., two, when particular operators are encountered and when the result of a particular operation is to be a subsequent operand, it is automatically detected and again stored in the Push Down Memory to be available when such subsequent operator is detected. The restoring of a result together with its level count is clearly indicated in steps ⑤ and ⑥ as well as in a number of other steps of the operation of this example. It will also be apparent that each time an operator is encountered, the Ⓒ and Ⓓ fields are loaded with the addresses of the suitable operands as they are read out of the Push Down Memory. This will be apparent by examining section (d) for any particular step or operator illustrated in the section (e).

Referring now to section (f), the contents of the Push Down Memory during the "second pass" will be explained. It will be noted that on step ⑯ which is the setting of the Word Select Control although it is actually the first step of the "second pass," the occurrence of the "end" symbol has initiated said "second pass." Going to step ⑮, it will be noted that an "operator" is detected which causes the 4 count previously stored in the uppermost position of the Push Down Memory to be gated out to the Ⓕ field for word position ⑮ and the 4 to be decremented by one and restored in the Push Down Memory. Step ⑭ detects another "operator" and repeats the operation down through step ⑫. It will be noted that in step ⑮, the "operator" causes a setting of the "*t*" flip-flop to a "1." In step ⑪, it will be noted that the flip-flop "*t*" is set back to a "0" and the push down cycle is stopped. Then, in step ⑩, with the detection of a second "data" character the Push Down Memory starts reading level counts back out of the system, until step ⑦ wherein the second series of "operators" is detected and the flip-flop "*t*" is again set to "1" and the push down cycle of memory again initiated. It will be noted in referring to the Ⓕ field of section (d) that the level count stored in the Ⓕ field for any given step is the number in the uppermost position of the Push Down Memory for the previous step.

By examining the Ⓔ and Ⓕ fields of the Word Register of section (d), it will be noticed that in some places the numbers are the same and in others the numbers will vary. In this particular example, the Ⓔ and Ⓕ fields for the actual operators remain the same, which in essence, means that the earliest time in which a given operation specified could be performed is also the latest time. Therefore, for this particular example there would be no particular advantages in examining the Ⓕ field on readout. However, in the subsequent Example III, certain advantages will be apparent. In Example II though, it will be noted that, for example, in the Ⓔ field for the actual data which designates the time at which a data fetch could be made, for example, for the data character "*b*," although the earliest time in which this data could be fetched is obviously the zero or data fetch time. However, it is to be noticed that the character, "*b*," is not used in an actual operation until it is necessary to perform the operation B which is performed in the time $t_2$. Therefore, it would be possible to delay the fetch of the "*b*" until time $t_1$. This indicated in the Ⓕ field for the "*b*" which shows a one or indicates that it could be accomplished at this later time. As will be apparent from the description of Example III, this same situation holds true where operation C, for example, might require an "operand" which was the result of an operand "*a*" and an operand "*a'*," which could, for example, be done in 1 time but since operation C does not occur until time $t_3$, the operation could be done as late as 2 time. In this case, the operation calling for manipulation of "*a*" and "*a'*" would have in its Ⓔ field the number one and in its Ⓕ field a number two.

It should be specifically noted at this time referring again to section (d) that only those members of the Word Register containing the "operator" need actually be used in controlling the operations of the subsequent computer system. However, it is necessary to utilize all of the storage locations in building up these tables as was previously described. In other words, only the word locations ⑤, ⑥, ⑦, ⑫, ⑪, ⑭, ⑮ and ⑮ have to be interrogated and utilized to perform the operations as these locations contain all of the operators, operands and indicia of their relationship.

While the numbers in the Ⓕ field relating to data words (i.e., not operators) are ignored in the present embodiment, in other embodiments these could be used to control operand fetches while instructions could still be issued in the manner described.

The following Example III is shown to illustrate the advantage of having both the Ⓔ and Ⓕ fields available for any given instruction, or in other words, having both the lowest level indicator for a particular operation as well as the highest level. Section (a) is the algebraic problem written in Reverse Polish form and section (b) is a tree diagram of the problem of section (a). This example does not show the respective contents of the push down store in forming ultimate Ⓔ and Ⓕ fields in the Word Register and it is not felt that this would materially add anything to the invention in view of the above Example II. Sections (c), (d) and (e) illustrate the assignments of the various operations of the algebraic problem stated in table (a), illustrating the relative assignment of operations to the Multiprocessor Unit for performance. Section (c) specifically illustrates the time that would be required if only the Ⓕ field were utilized and section (d), the total time required for a three Processor Unit if only the Ⓔ field were used. Section (e) illustrates the results of the operation if the combination of the Ⓔ and Ⓕ fields were utilized together with the special assorting and control circuitry of the output section of the present invention. Section (f) illustrates the contents of Ⓐ, Ⓑ, Ⓕ and Ⓔ fields of the Word Register, it being noted that only those word locations containing an operator in the Ⓐ field are utilized.

The following description of Example III is intended to illustrate the advantages of assembling both the Ⓕ and Ⓔ field. For the purposes of this example, it will be assumed that three Process Units are available, $p_1$, $p_2$ and $p_3$. A conventional Sorting Register is assumed to be utilized for all three of the possible modes of operation described in this example and operates on the principle that starting with the top of the Ⓕ and/or Ⓔ field will provide an indication sequentially of which number is the lowest order number in these columns considering each word location a two digit number. A specific reference to a particular sorting register for accomplishing this type of sort will be made in the subsequent description of the readout or "perform computation" portion of the system.

EXAMPLE III (a)

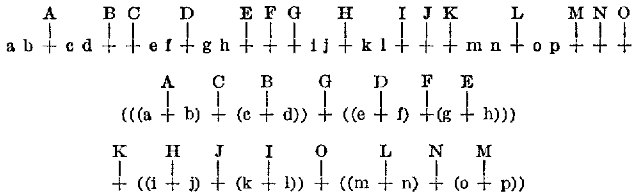

(b)

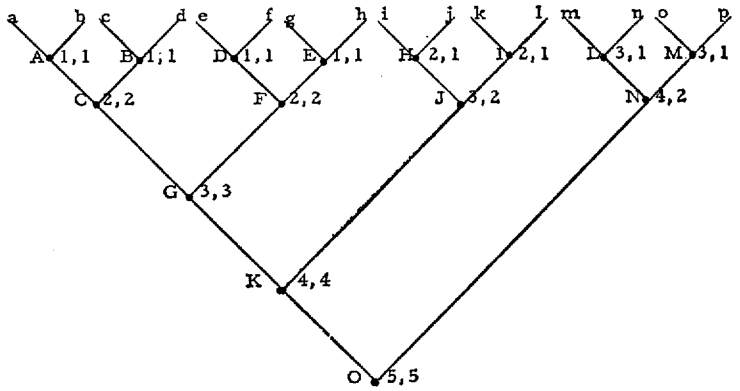

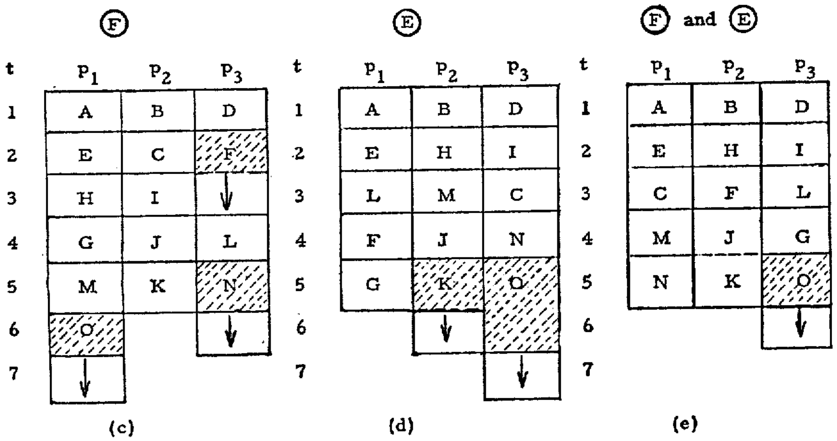

(c) (d) (e)

| Ⓐ | Ⓑ | Ⓕ | Ⓔ |
|---|---|---|---|
| + | A | 1 | 1 |
| + | B | 1 | 1 |
| + | C | 2 | 2 |
| + | D | 1 | 1 |
| + | E | 1 | 1 |
| + | F | 2 | 2 |
| + | G | 3 | 3 |
| + | H | 2 | 1 |
| + | I | 2 | 1 |
| + | J | 3 | 2 |
| + | K | 4 | 4 |
| + | L | 3 | 1 |
| + | M | 3 | 1 |
| + | N | 4 | 2 |
| + | O | 5 | 5 |

(f)

Referring now specifically to the above example, wherein section (a) represents an algebraic expression written in Reverse Polish notation, it will be noted that over each of the operators a capital letter is indicated, which capital letter represents the result of the particular operator to which it is adjacent. These capital letters are shown as the results of operations shown in the tree structure of section (b). In this tree structure each intersection represents a particular operation and each such intersection is marked with the associated capital letter or result indicated in section (a). Adjacent each intersection two numbers will also be seen, these numbers are those which would be tabulated in the Ⓕ and Ⓔ fields respectively for this particular result when determined by the present system. Tables (c), (d) and (e), as stated previously, represent a Timing Chart for the system wherein the Ⓕ field, Ⓔ field and the combination of the Ⓕ and Ⓔ fields is used as the basis on which to assign operations to the three computers, $p_1$, $p_2$ and $p_3$. The vertical rows in each of these tables represent the jobs assigned to a particular computer, and each successive horizontal row represents a successive time sequence necessary to perform the particular indicated operations. Each of the individual blocks in these tables containing a particular upper case letter indicates the particular operation assigned to each computer in a particular time period in accordance with the sort made on the indicated field in the Word Registers.

Having explained the operation of the system, it will not be necessary to specifically explain how the Word Register contents indicated in section (f) is loaded by the system. That the numbers appearing in the Ⓕ and Ⓔ fields of section (f) is correct will be readily apparent by an examination of table (b).

Referring now to section (c), it will first be assumed that the three processors are to be assigned jobs or operations in accordance with the listings in the Ⓕ field alone. If this is the case, during the first time period a search through the Ⓕ field will reveal that jobs A, B and D have the three lowest level numbers associated therewith and will be assigned to the three processors respectively. Assuming that these are done in the first time period, the next three lowest number jobs, E, C, and F, will be assigned respectively to the three processors. However, it will be noted that the job F cannot be done in the second time period because the result of the job E is itself being performed in this time period, i.e., 2. Therefore, job F must be held up for one time period until the job E is itself completed. The cross hatching in the block containing the *f* indicates that processor $p_3$ is not able to complete its instruction in the time period assigned since one of the operands is not yet available. Therefore, job F will have to be deferred until the third time period. In time period 3, jobs A and I being the next two lowest job numbers are assigned and performed in processors $p_1$ and $p_2$ while $p_3$ now performs job F. Similarly, in time period 4, jobs G, J and L are performed by the three computers and in time period 5, jobs M and K are assigned to processors $p_1$ and $p_2$, however, when job N is assigned to processor $p_3$, again this processor finds that one of its operands, namely job M, is not yet available and the processor $p_3$ must again wait and be idle for this time period. Similarly, during time period 6, job O, the last job to be assigned, is given to processor $p_1$ since one of its operands, namely job N, is not yet available as it is being currently performed by $p_3$, it must remain idle during the time period 6 and ultimately perform job O during time period 7. It may thus be seen that using the Ⓕ field only, seven time periods are required using three processors to accomplish the algebraic instruction indicated in section (a).

Referring now to section (d), the operation of this system using only those numbers appearing in the Ⓔ field of the Word Register will be explained. The assignment of the various jobs to the registers is identical in section (d) as in (c). The difference being that the list of level or time precedence numbers differs in certain spots which obviously changes the order of assignments of the various jobs. It will be seen that down through time period 4, the processors' times are utilized to their fullest extent or in other words, do not require any idle time. However, in time 5, it will be seen that the assignment of jobs K and O to processors $p_2$ and $p_3$ require that both processors $p_2$ and $p_3$ remain idle during time period 5 until job G is completed which was necessary to obtain one of the operands from job K. In time period 6, job K is performed but processor $p_3$ must again remain idle during this time since job O requires the result of job K as one of its operands. Therefore, it may be seen that here again a total of seven time periods are required in order for the entire instruction to be performed.

Section (e) as stated previously, represents the assignment of jobs to the three Process Units utilizing the combination of the Ⓕ and Ⓔ fields as stored in the Word Register as a basis for assigning jobs. Referring now to section (e), it will be noted that all three Process Units remain fully active during the first four time periods and that during time period 5, processor 3 must wait until job K is completed. However, in time period 6, $p_3$ proceeds with the performance of job O and thus within six time periods, the entire expression may be performed. It will thus be seen that the utilization of both the Ⓕ and Ⓔ fields allows a saving of one time period in the system.

While this saving of one time period in the present example does not seem overly important, it is to be remembered that this example is an extremely simplified one utilized only for purposes of illustrating the advantages of the invention and that in actuality, most problems assigned to a computer would contain many, many more steps and that such savings in time would be greatly magnified and it would thus represent a valuable economy in terms of machine time in the actual performance of machine operations.

Having now generally described the input and evaluation sections of the invention wherein the Word Registers are filled and indicators provided in the Ⓕ and Ⓔ fields for the optimum performance of the expression in parallel, the read out or performance portion of the system which actually assigns the various operations to the multicomputer system will be explained.

First, reference will be made to FIGURE 1B in which a general block diagram of the output portion of the system is illustrated. This figure, like FIGURE 1A, shows only the major functional blocks of the system and is intended to illustrate the general lay-out of said system. Referring now particularly to the figure, it will be noticed that three processors, numbers 1, 2 and *n*, are illustrated in the diagram. Each of these processors is indicated to have a Control block. The function of the Control block for each processor is to first determine whether the particular processor is ready to receive a job, indicate when it has received a job and that it is no longer available, and analyze each job to see if the processor can proceed immediately with the job or must wait until one of the operands of the job assigned is completed in a previous processor step. The controls for each of the processors is identical and means are provided as will be described subsequently for rippling test pulses through these processor controls to determine which processors are available for doing a particular available job. The Word Register is the same as that shown in the input section 1A of the system and is shown here separately for purposes of clarity. It will further be noted that the Word Register is broken into portions, namely the Ⓐ, Ⓑ, Ⓒ, and Ⓓ fields which actually contain all of the information necessary to perform a particular operation referred to as Word Register in FIGURE 1A and the Ⓔ and Ⓕ fields which are shown combined with sorting controls and referred to as Sorting Register for determining which of the multiplicity of operations stored in the main Word Register are to be performed at any given time. The Results Register 14 is shown as a separate block and is used to store the results of particular operations in an address location as indicated in the Ⓑ field of the Word Register. This Results Register, in addition to storing the result, is also provided with a storage location for a "ready bit" which, as will be explained more fully subsequently, allows a rapid inspection of a particular result location to determine whether this result has as yet been obtained. Thus, as will be apparent, results are continually read into the Results Register and subsequently read out when the results are to be used as operands in subsequent operations.

Figure 1B:
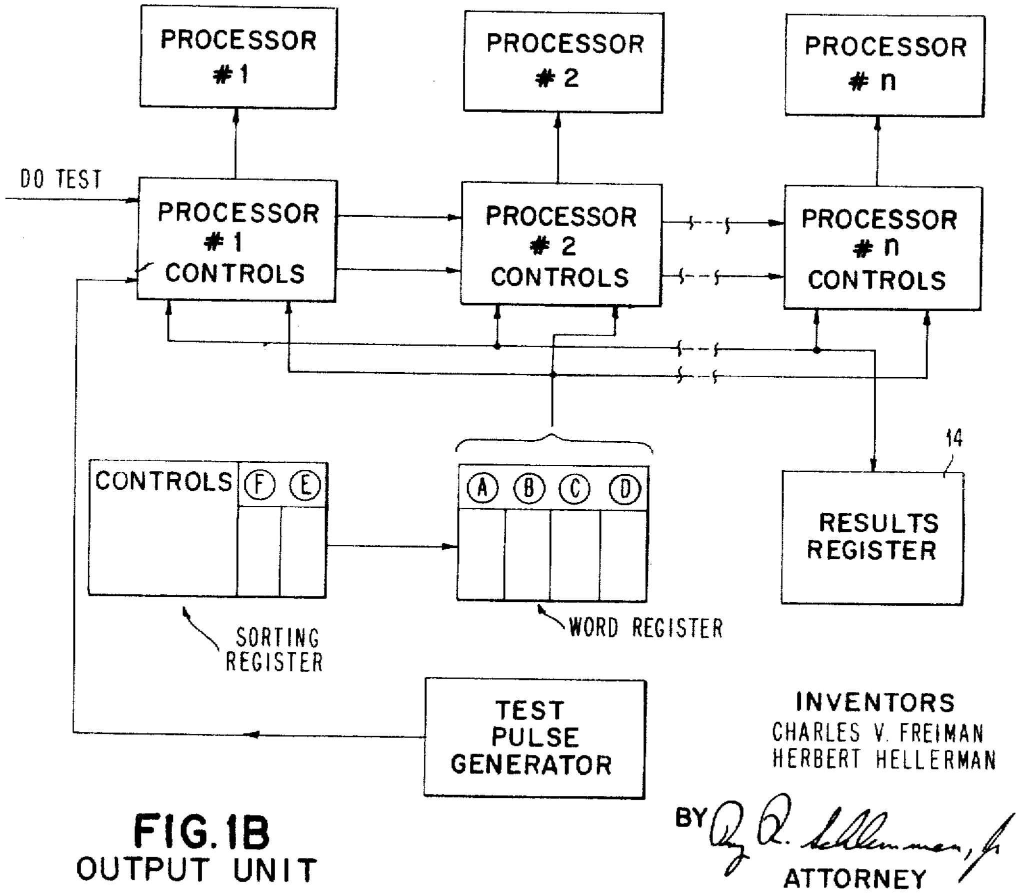
FIGURE 1B is similar to FIGURE 1A and illustrates a preferred embodiment of a readout system for supplying control signals and data addresses to a typical parallel processing system.

The lower block of FIGURE 1B is the Test Pulse Generator which generates two distinct trains of test pulses which will be referred to later as test pulse #1 and test pulse #2 which test first whether a processor is ready to receive a new instruction and subsequently, tests whether the given instruction given to a processor is ready to be performed as a result of all operands being available. The test pulse generator of FIGURE 1B takes the place of the timing circuitry 22 of FIGURE 1A. It is thus apparent that the timing of the read out portion of the system is more truly asynchronous than that of the input portion. The waveforms produced by the timing pulse generator for the test #1 and test #2 are illustrated by way of example in FIGURE 12 which will be described more fully subsequently.

Before proceeding through the detailed description of the system as disclosed in the logical schematic diagrams of FIGURES 7A through 11, the procedures and tests which must be made in the read out portion of the system will be generally described. It will first be assumed that the clock pulse 24 of the input system has completed its cycle and a zero detected in the Word Select Control indicating that the "second pass" is completed and that an instruction to do the operation is received by the system. The first test that must be made is to locate a processor which is free. Then, the first operation called for by the list of the Ⓕ and Ⓔ fields of the Word Register must be located and this operation transmitted to the processor just located. At this point the processor controls must determine whether the operands included in the instruction assigned are presently available. In other words, it must determine whether they are memory addresses indicating raw data or operands and if this is the case, it is obvious that this data may be immediately retrieved and the operation performed or whether the operands are result addresses. In this latter case, if either of the operands is a result address, a test of the Results Register must be made at the indicated address for an indication of whether or not that particular result is available. If the result is not available, the system will continue to test the Result Register in accordance with the aforesaid test pulse and as soon as the result becomes available, the system will receive a signal to proceed with the operation. After the operation is completed, the result must be placed in the system Results Register together with a ready bit which as will be described subsequently, is utilized to quickly test whether or not a result is available in said Results Register.

The same sequence of steps is repeated every time an empty or unused processor appears in the system. In other words, it will obtain the next sequential operation from the Word Register Sorting Section and make the necessary tests to determine whether or not said operation can be done immediately or must wait until a result operand is received. The present system continually tests to find processors which are not busy and each time such a processor is found, the next sequential operation will be assigned to this processor until all operations have been assigned, at which point a suitable finish signal will be provided.

Having thus generally described the operation of the invention, there will follow a specific description of the detailed logical schematic diagram of FIGURES 7A through 11.

Referring now specifically to FIGURE 7, it will be noted that this figure actually comprises FIGURES 7A and 7B, there will be seen the Word Register 60 which is shown broken into two parts, Section 200 which contains the Ⓐ, Ⓑ, Ⓒ and Ⓓ fields and Section 202 which contains the Ⓕ and Ⓔ fields and also a block indicated as Controls which comprises the sorting circuitry for selecting the next lowest number in the Ⓕ, Ⓔ field columns starting with the top of such list each time a request for a new operator is received. Such sorting routine is well known in the art and could be performed by a conventional card sorting machine. A particular electronic structure for accomplishing such a sort is illustrated in the copending application Ser. No. 176,958 of R. I. Roth entitled "Random Memory with Ordered Read Out" and filed Mar. 2, 1962. The significant feature of this circuitry is that each time a select signal is received, a particular line will be brought up depending on which number in the combination Ⓕ, Ⓔ list is the next lowest starting at the top. It will also be noted that when a particular job is assigned as indicated by a signal on line 218, a pulse is passed through DELAY circuit 219 and returned to that location of Section 202 of the Word Register which was just selected and remove this operation or word position from the available operation list. The delay of circuit 219 is to allow reading of the contents of the Ⓐ, Ⓑ, Ⓒ and Ⓓ fields of the Word Register into the Processor Input Registers.

The turn on signal for this portion of the system supplies power to the entire system thus initiating the Test Pulse Generator, setting all of the flip-flops indicated in FIGURES 7A through 11 to that state to which the reset "R" pulse is connected by means of the arrow. As will be understood, this power turn on initializes all of the flip-flops in the system to start testing for availability of a processor to start performing operations. Referring to the logical circuitry for processor 1, the upper left portion of FIGURE 7A, when a test pulse is received on line 204, it is supplied to AND circuits 206 and 208. Since the "ready" flip-flop 210 for processor 1 is set to a "1," the AND circuit 208 will be enabled, thus producing a pulse on line 212. This pulse passes through OR gate 214 and initiates the sorting circuitry controls in the Word Register Section 202 on line 216. This list causes the lowest number operation of the Ⓕ, Ⓔ field list to be selected by block 202 and a suitable word selected and a pulse provided on, for example, line 218, which will select a particular word location of the Word Register 200. This selection of a particular address location of the Word Register causes a complete word to be read out of the Word Register Section 200 through gate 220. It will be noted that gate 220 was enabled by the pulse coming out of AND gate 208, passing over line 212 which sets the job requested flip-flop 222 for processor 1 to its "1" state which enables the word stored in Section 200 of the Word Register to be gated into the processor #1 Input Register 224. When the particular word location is selected by line 218, a pulse is generated on line 226 coming out of the Word Register on the right hand side which proceeds to OR circuit 228 and thence out through the delay 230. This delay is intended to be long enough to enable the gating of the word from the Word Register into any one of the Processor Input Registers. On the appearance of a pulse on line 232 coming out of delay 230, AND circuit 234 is enabled together with the setting to "1" of flip-flop 222 which accomplishes the setting of flip-flop 222 and flip-flop 210 to their "0" state. The resetting of flip-flop 222 to the "0" state opens gate circuit 220 to prevent the reading of any subsequently selected word into this patricular register inadvertently. The setting of flip-flop 210 to "0" provides an enabling pulse for AND circuit 206 and indicates that processor 1 is not capable of receiving a further instruction and thus allows the test pulse #1 to proceed down the line to the next processor which is not currently active, in this case, processor #2.

Thus, at this point an inactive processor has been lo-

:ated by the test pulse #1 and the highest priority current )peration as determined by the sorting controls from the 1umbers in Ⓕ and Ⓔ fields of the Word Register has been ;elected and routed into the Input Register 224 for this )rocessor. It will be understood that the logical circuitry ndicated in FIGURE 7A for processors 2 through *n* )perate in precisely the same manner as for processor 1 1nd for this reason, the operation of each of these logical :ircuits is not presented here nor are the particular logical elements provided with reference numerals.

The next stage of operation proceeds to FIGURES 7B and 8 which is the logical circuitry which tests .o determine whether or not the operands currenty stored in the Input Register 224 are available :o the system or whether the processor must wait .intil a particular result is obtained. When flip-flops 210 and 222 are reset to their "0" state, a pulse goes out on line 236. This pulse is shown coming in through the flip-flop 238 or the "job assigned flip-flop" and the pulse sets this flip-flop to its "1" state. The setting of flip-flop 238 to a "1" enables AND circuit 240 to produce an output pulse when the test pulse #2 is received on line 242.

As indicated previously, the test pulse #2 is for the purpose of testing the condition of the operands assigned to any particular processor to see if the operands are currently available and that the operation is thus capable of immediate performance. Also, as stated previously, either of the operands for a particular operator may be a result and if such operand is a result, a test must be made to see if the particular operation of which this result is the object has previously been performed, thus making said result available to the processor for performance of the current operation. The logical circuitry of FIGURE 8 operates to accomplish this in the following manner.

It will first be necessary to refer briefly to FIGURE 7B wherein it will be seen that coming out of the Processor Input Register 224 are three decoders, Decoder #1, Decoder #2 and Decoder #3 for the data #1 section, the data #2 section and the record address section respectively of said Input Register 224. The first of these two decoders it will be noted have two outputs which automatically determine whether a given operand address is a memory address or a result address. These two lines are marked M. A. and R. A. in the drawings, respectively, for the two decoders. In addition, these decoders have a second series of outputs which are decoded into a particular line select for the Results Register. Thus, when any operand is a result and its address is gated to one of the two Data Registers, data #1 or data #2, this address will be decoded and a line coming out of the Decoder #1 or #2 will select a particular storage location of the Results Register through the Crossbar Switch which will be explained subsequently. Decoder #3 is utilized for the purpose of choosing the proper word location in the Results Register 14 into which a result of an operation is to be gated subsequent to the completion of said operation and operates in exactly the same manner as Decoders #1 and #3. All three decoders have as many output lines as there are storage locations in the Results Register. The gate circuits shown in the outputs of all three function to gate the selection pulse from the decoders at a desired time as will be apparent to one skilled in the art.

Having explained the functions of the three decoders and their relative gate circuits, the description of FIGURE 8 will now continue. As stated above, assuming that the AND circuit 240 is enabled and an output appears on line 242, the circuitry of FIGURE 8 tests for the availability of data and after successful tests are made, provides an indication that the processor is to proceed with the operation.

It will first be assumed that both of the operands in the data address portions of the Processor Input Register 224 contains a memory address or data rather than a result. In this event, the following steps occur. Decoders #1 and #2 each provide a pulse on the line MA which come into lines 244 and 246 respectively on FIGURE 8. The pulse on line 244 is ANDed with the pulse on line 242 and AND circuit 248, producing a pulse on line 250 which is ANDed in AND circuit 252 with a pulse on line 246. The output of the AND circuit 252 goes through OR 254 providing a signal which indicates that both operands are immediately available to the system and that the processor may proceed with the operation. Concurrently with this signal, a feedback is provided on line 256 which resets the flip-flop 238 to its "0" state thus preventing the continuous testing of the system by the test pulse #2 appearing on line 242. Since both operands are available and the processor is proceeding with the operation, it is no longer necessary to make the test #2.

Considering now the situation where the data #1 section of the Processor Input Register 224 contains a result address, the following occurrences take place. The pulse on line 242 provides one input to AND circuit 258, the other input to which is supplied by the R. A. line 260 from Decoder #1 being up. The output pulse from AND circuit 258 provides a read register pulse for the register gate circuit 262 applied on line 264. This pulse causes the result address in the data address #1 portion of the Input Register 224 to select the proper word location in the Results Register and gate the contents of same into the Data #1 Register 400 for the processor #1 shown in FIGURE 9. The pulse on line 264 passes through OR circuit 266 and is delayed through delay 268 and provides one input to AND circuits 270 and 272. Since line 260 was up, AND circuit 270 is enabled and thus provides an input to AND circuit 274. AND circuit 274, in effect, tests for the presence of the "ready bit" in the Data #1 Register 400 for the processor #1 and the "ready bit" is present which brings line 273 up, thus indicating that the result has been obtained, AND circuit 274 is enabled, thus providing a pulse through OR circuit 276 and into AND circuits 278 and 280. AND circuits 278 and 280 test whether the data #2 section of the Input Register contained a memory address or a result address. If a memory address is contained, the AND circuit 280 is enabled by line 246 and thus provides a pulse through OR circuit 254 which tells the processor that the result whose address is stored in the data #1 section of the Processor Input Register is currently available and that the address stored in the data #2 section of the Processor Input Register is a memory address and is thus available and that thus the system is ready to proceed with its assigned operation.

If the result address should appear in the data #2 section rather than the data #1 section, a similar set of operations occur wherein the AND circuit 282 is enabled by the test #2 pulse and the occurrence of a pulse on line 284 from the Decoder #2 of FIGURE 7, thus causing a pulse to appear on line 286 which pulse passes through the system in an obvious manner until it reaches AND circuit 288 which determines whether or not a "ready bit" is contained with the result in the Data #2 Register 402 of FIGURE 9.

As stated previously, either or both of the data or operand addresses stored in the data address portions of the Processor Input Registers for either operand may be result addresses or memory addresses. The significant feature of the circuit of FIGURE 8 is that the test pulse #2 will cause the Results Register 14 to be continually re-read and stored in the Data #1 and #2 Registers 400 and 402 of FIGURE 9 and re-test the contents thereof for the ready bit until such ready bit appears. And until such ready bit occurs, there will never be a pulse transmitted through the system through OR circuit 254 on line 256 which would indicate that the processor may go ahead. Also, as stated previously, when it is said that a signal does appear on line 256, the "job assigned flip-flop" 238 is reset to "0" and the test #2 is no longer made on this processor control circuit until a new job is assigned thereto.

It should be noted that the three Decoder blocks at the top of FIGURE 7A are shown in detail in FIGURE 7B, wherein the Processor Input Register 224 is repeated for purposes of clarity. Each processor has such a Decoder block connected to its respective Input Register and control circuitry.

It has now been explained how the present system first selects an available processor to perform the next sequential operation called for by the system and then selects the next operation from the list of available operations. There will now follow a brief description of the manner in which results are restored into the Result Register upon the termination or completion of a particular operation by a processor. This explanation may best be seen by referring to FIGURE 9. In FIGURE 9, the Data #1 Register 400, the Data #2 Register 402 and the Results Register 404 for any given processor comprise essentially the working registers for the individual processors. It will be noted that the Data #1 Register 400 and Data #2 Register are shown having inputs from the Crossbar Switch (read out) and also from memory. This is to show that the particular operands may be obtained from either of the two sources. Although normally the data would not be gated into the Data #1 or #2 Registers from memory until the processor go ahead signal were received as the data is gated into these registers prior to this time solely in order to test whether or not the "ready bit" for the particular result word has been set. It will be noted that in the Processor Result Registers, in the Results Register 14 per se and in both of the Data Registers a "ready bit" location is provided. It will be understood that at the beginning of any system cycle, all of the ready bits in the Results Register would be reset to "0" and that the "ready bit" location in the Results Register is automatically set to a "1" when a result is stored therein by the associated processor and said "1" is automatically stored in the Results Register with said result.

The Crossbar Switches utilized for reading information in and out of said Result Register are well known in the art. These switches in each instance comprise a plurality of input lines, a single set of output lines and a plurality of AND circuits connected therebetween in a manner to be described with reference to FIGURES 10 and 11. It will be noted that the Crossbar Switch for read in contains a single dark area at the intersection of the cables for each register in each word location. Thus, it will be noted that the dark areas represent a matrix, any member of which may be seletced to choose the proper Process Result Register and a particular Result Register word address from the Result Address Decoder #3 of FIGURE 7B. Thus, referring to FIGURE 9, the dark area represented by the legend P#1, W.A. indicates that this would be the matrix position selected to gate the results from the Processor #1 Result Register into the A position of the Result Register. Similarly, the area denoted P#*n*, W.A. denotes the matrix switch selection which would result in the gating of the contents of the Processor *n* Result Register into the A position of the Result Register. The same terminology applies to the bits shown, for example, in the lower left and lower right hand corners of the Crossbar Switch for read in, i.e., P#1; Wα; P#*n*, Wα.

An exemplary embodiment of a single matrix element for the Crossbar Switch for "read in" is shown in FIGURE 10. The vertical lines of the figure represent input lines from a particular Processor Result Register. While only eight lines are shown, it is to be understood that for each matrix position, there are as many lines as is necessary to represent the number of digits that are present in a particular result as well as the "ready bit" position.

Similarly, there are as many horizontal or output lines as there are vertical lines or input lines. It will be noted that the vertical lines constitute one of the inputs to the plurality of AND circuits coupled between the input and output lines and that a particular group of AND circuits is energized and thus rendered capable of giving an output depending upon whether the line 300 receives a read in pulse, which pulse will be received automatically when a processor has completed an operation. It will be noted that the single line 300 will thread all the way across the Crossbar Switch and provides a single input to all of the AND circuits in the word A row. A similar line is provided for each of the additional word positions. It is, of course, apparent that only one word line may be energized at a time and similarly, only one processor will be ready for storing results into the Results Register at a time otherwise the system would not function properly. The necessary timing controls for this lock out feature are not specifically shown since any coincident pulse selection scheme applying such matrices requires such a lock out feature. Thus, it may be seen that by selecting a desired word select line, i.e., 300, in the Crossbar Switch for "read in" together with having data in a particular Processor Result Register, such result may be stored in any desired word location in the Result Register.

The Crossbar Switch for "read out" is essentially identical to the Crossbar Switch for "read in" with the exception that two matrix locations are provided for each Processor Unit for every word location rather than one. This is because on the "read in" cycle it is only necesasry to store a single result in the Results Register 14 at any given time sequence, however, on "read out," when it is desired to gate data into the Data Registers, it is necessary or in any event desirable to fill both registers concurrently. Referring to FIGURE 11, the vertical lines this time are indicated as the read out lines which will go to the various Data Registers, i.e., Data #1 Register for Processor #1, for the processors and the horizontal lines are the signal input means coming from the various word locations of the Results Register 14. The AND circuits in this matrix position of the Crossbar Switch function in exactly the same manner as the AND circuits in the read in, in the Crossbar Switch of FIGURE 10. In other words, the input to the AND circuits coming from the Results Register, in this example word A, and the "ready bit" provide one of the inputs to the AND circuits. A pulse on line 302 from the Decoder #1, Processor #1, word A line performs in exactly the same manner as the line 300 of the Crossbar Switch for read in. With the output switch a separate gate line such as 302 must be provided for each of the matrix locations to avoid any double read out which would otherwise occur if all of the vertical matrix positions were connected together as in the Crossbar Switch for read in. As stated previously, each processor has two matrix positions for each word to allow the simultaneous read in of data into both of the Data Registers. The matrix location for the data #2 location is exactly the same as that shown in FIGURE 11 for data #1 except that the energizing line such as 302 would emanate from in this example the Decoder #2 of Processor #1 and would, of course, be some other word address other than A as the system would obviously not store two operands in the same word location. Thus, by use of the Crossbar Switches for both reading in and reading out of the Results Register 14, data may be conveniently stored in and read from said register with a minimum of timing and other auxiliary controls.

Referring back to FIGURE 7A, the line 304 emanating from the bottom of the controls column of Section 202 of the Word Register provides a signal when the system determines that there are no more operations to be performed. This signal when suitably delayed to allow the completion of the last possible computer operation indicate that the particular operation called for is terminated and that the result is stored at the last assigned location in the Word Register field Ⓑ.

FIGURE 12 is a timing chart of the primary timing pulses utilized in the output portions of the present system which, as stated previously, are provided by a suitable oscillator in the Test Pulse Generator block of FIGURE 10. The pulses for both tests #1 and #2 are merely conventional spikes. It should be understood that the recurrence rate or frequency of the pulses is substantially greater than the performance cycle of a processor since it is necessary to start a processor operation as soon as possible after an operand or processor becomes available. The pulse labeled "from Delay 230" is shown delayed from test pulse #1 and it is this delay which allows the gating of data from the Word Register. Similarly, only one pulse is shown since in any given Processor Control Unit once the unit is selected and the "ready" flip-flop 210 reset, the test pulse #1 no longer passes through the system. The test pulse #2 is illustrated as being of the same frequency as test pulse #1 and delayed in place therefrom. This delay would optimumly be enough to allow the above "ready" flip-flop to be reset, at which time any processor is ready to start examining its assigned operation. It is to be understood, however, that the frequency and phase relationships between test pulses #1 and #2 are not in any way critical as the two functions are separate. However, as in the case of test pulse #1, test pulse #2 should have a repetition frequency much greater than a processor cycle time to allow optimum utilization of the processors.

The above description of the output portion of the present system completes the description of the illustrated embodiment of the present invention for analyzing an algebraic expression written in a grouped parentheses free notation for parallel execution capabilities and also for executing these operations in accordance with such analysis. Although a specific embodiment including hardware configurations has been set forth and described, it is to be understood that the particular embodiment disclosed is intended to be exemplary of the invention and not to be construed as limiting thereon.

As stated previously, other notation forms may be used such as Forward Polish notation and the like wherein the operators appear in an expression before related operands. Changing the timing sequences of the present system to handle such expressions would be obvious to a person skilled in the art based on the teachings of the present invention.

Further examples of particular hardware items which may have different embodiments for use in various portions of the system in place of those disclosed are, for example, the Results Register. This register may either be a separate register having multiple storage locations as disclosed or could be part of main memory having its own address generating counters and the like. Also, the Crossbar Switches have been illustrated for convenience in storing into and accessing from said Results Register, other switching systems would be apparent to persons skilled in the art.

Further, as referred to previously with respect to the "input" portion of the system, preparing the Ⓕ field by the "second pass" is an improvement on the most basic concept of the invention wherein only the Ⓔ field of the "first pass" is prepared. A suitable "read out" system for use with only the Ⓔ field is disclosed in an article by H. Hellerman in the I.B.M. Technical Disclosure Bulletin, May 1964, vol. 6, No. 12 entitled "System Organization for Execution of Parallel Operations in Algebraic Statements." It may thus be seen that the present invention has wide application in any multiprocessor computer system where a high degree of parallelism is desired.

In summation, the significant feature of the present invention is that it provides what is, in effect, an automatic compiling system for use with a multiprocessor computer system. It automatically analyzes a particular type of mathematical input expression format, which format is well known, for parallel execution opportunities and then automatically assigns individual operations to such a computer system which assignment maximizes the utilization of each Process Unit. The system has potential use with any compiling system having a plurality of Processor Units available and it requires nothing of the programmer other than to know the format.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for automatically compiling a mathematical expression written in grouped parentheses free notation and for supplying operations to a multiprocessor computer system for maximum parallelism, said system comprising:

a plurality of arithmetic devices capable of simultaneous operation, means for examining the mathematical expression and for establishing indications of the precedence level of each operation indicated by the expression, means responsive to said precedence indication for effecting a determination of equi-precedent level operations, and means for controlling the routing of required operations to individual arithmetic devices for concurrent calculation of the operations.

2. An automatic compiling system as set forth in claim 1 wherein said determination means includes means for routing operations to individual arithmetic units in ascending orders of their precedence level indications.

3. An automatic compiling system as set forth in claim 1 including a plurality of storage areas wherein a separate storage area is provided for each operation, and means for storing in each of said areas information denoting the operation required, the result address in memory for the result of said operation, the operand addresses in memory and a special level indicator indicating the relative precedence level of a particular operation relative to operations wherein all operands are raw data.

4. A system for automatically compiling machine instructions in accordance with a mathematical expression written in grouped parentheses free notation form wherein the relative position of any operator is directly relatable to a particular pair of operands in said expression, said system being adapted for supplying operations to a multiprocessor computer system comprising:

means for ascertaining how many operations are necessary to obtain an ultimate operand for each operator, and means for assigning a first relative level count number to each of said operators in accordance with the number of operations necessary to obtain said first level count number, said number being relative to those operations whose operands are raw data.

5. An automatic compiling system as set forth in claim 4 including means for determining a second relative level count number for each operator including:

means for detecting the first level count number for the next subsequent operation using the result of the current operation as an operand, and means for subtracting one from this number to generate said second level count number.

6. An automatic compiling system for operating on a mathematical expression written in a parentheses free notation containing groups of raw data operands and operators wherein each operator is related to a particular pair of operands ascertainable by its position relative to said groups, said system including a first evaluation means comprising:

first memory means for storing each of said operators and raw data operands in separate storage location areas, means for automatically assigning a result address to be used as the storage location for the result of each operator, said address being stored with said operator in said first memory means, first scanning means to sequentially scan the contents of said first memory means to detect raw data operands and operators, push down memory means under control of said scanning means for sequentially storing operands detected in said first memory means together with a characteristic level count number for each said operand, means for storing a level count number of "zero" with each raw data operand, means for extracting the top two operands stored in said push down memory means and storing same in said first memory means in a storage location directly related to a particular operator each time an operator is detected, means for comparing the level counts stored with each of the two operands, selecting the larger, incrementing it by "one" and storing same in a first special level count field in the first memory means at a storage location directly related to a particular operator, means for storing the result address of the detected operator in the upper storage location of said push down memory means together with said level count number stored in said first special level count field, and means to continue said scan and examine each character of the input expression stored in the first memory means in the same manner until the end of the expression is detected.

7. An automatic compiling system as set forth in claim 6 wherein said first memory means comprises a special memory having at least as many multiple word storage areas as there are operands and operators in any expression to be evaluated, each said area having a separate storage location for storing an indication of:

(1) an operation code indicating whether a character of the mathematical expression is raw data or a particular operator, (2) the address in memory of raw data or the address in a special result storage location where the result of an operator is to be stored, (3) a first operand address storage location for each storage area containing an operator, (4) a second operand address storage location for each storage area containing an operator, (5) a first special level count number storage location for indicating the earliest relative time period in which an operation may be formed, and (6) a second special level count number storage location for indicating the latest relative time during which a particular operation may be performed, and means operable to select any of the said storage areas and particular storage locations therein whereby each such storage area containing an operator defines a complete machine operation.

8. An automatic compiling system as set forth in claim 7 wherein the means for automatically assigning a storage address to be used as a storage location for the result of each operator comprises:

a counter which begins assigning addresses at a fixed address for a given machine storage location, and means for incrementing said counter each time an operator is encountered in the input expression and it is necessary to assign a new result address storage location.

9. An automatic compiling system as set forth in claim 8 wherein said system is under the control of a central timing circuit, said circuit comprising:

successive signal shot multivibrators each of which has a first output signal upon "turn on," the second output signal upon "turn off," the "turn off" of one multivibrator stage being capable of turning on a successive stage, means for controlling branching within said timing circuit means which includes plural gate circuit means in parallel with the output of a particular multivibrator stage, and each said gate circuit having an input from a different test point whereby the occurrence of a particular character in the input expression may be used to control the timing sequence.

10. An automatic compiling system as set forth in claim 9 wherein said push down memory means includes:

a storage area for storing the address of an operand, and a storage area for storing a characteristic level count number wherein the special level count number which is generated by the system for a particular operator may be stored.

11. An automatic compiling system as set forth in claim 10 wherein said comparison means includes:

storage register means for each characteristic level count number, a comparison register connected to each of said storage registers, and means including two outputs from said comparison register one of which is actuated in accordance with which of said storage registers contains a larger number and gate circuit means actuable by one of said lines for transferring the larger of the numbers into a level counter means wherein the number may be suitably decremented.

12. An automatic compiling system for a multiprocessor computer system as set forth in claim 7 including means for evaluating said mathematical expression stored in said first memory means subsequent to completion of the operation performed by said first scanning means whereby the first level count number storage area in said first memory means is filled with special level count numbers for each character of said expression, said evaluating means comprising:

means for accessing those areas of said first memory means in which an operator and its complete operation data is stored and for specifically sorting said areas based on the said special level count numbers stored in each area to provide successive operations to the individual processors of the multiprocessor computer system, means for assigning said operations in accordance with said sorting operation on an ascending order basis, and means for assigning all lower order operations before any higher order operation may be assigned.

13. An automatic compiling system for use with a multiprocessor computer organization as set forth in claim 7 including:

sorting means for indicating the storage area containing an operator having the lowest special level count number associated therewith, means for extracting from each storage area in said first memory means the complete operation information stored with each operator including the operator itself, the result address where the result of the operation is to be stored, the address of the two operands related to said operator and the special level count number associated with each said operator, means to determine when a processor unit is available, means for transmitting said complete operation information selected from said first memory means to said processor upon command, means for determining whether the operands for said processor are raw data or the result of some previous operation, means for determining whether such previous operation has been performed, means to initiate the operation of the processor when it is determined that all operands are available, means for returning the result to the proper storage location in accordance with the result address provided with said operator, means for continuing said operations until all of the operations called for in said first storage means have been completed, and means for indicating that a processor is available for another operation as soon as a current operation is completed and the result stored.

14. An automatic compiling system as set forth in claim 6 including:

means for determining the latest relative time in which an operation may be performed which comprises:

second scanning means operable upon the detection of the end of the mathematical expression by said first scanning means operable to sequentially scan said expression in said first storage means in the reverse direction from the end thereof for detecting the presence of an operator or an operand.

bistable means settable to a first stable state upon the initiation of said second scanning means, means for transferring the special level count number stored in the top position of said push down memory means to a second special level count storage position in said first memory means and storing same in a storage location directly relatable to a character being scanned each time a new character is examined by said second scanning means, means responsive to the detection of an operand in said first memory means together with the setting of the bistable means in its second state effective to reset the bistable means to its second state and return control to said second scanning means to proceed with the next step of said scan in said first memory means, means operable to initiate a push down cycle of said push down memory means if an operand is detected in said special memory means and said bistable means is set to its first state or if an operator is detected in said first memory means, means to step the second scanning means to the next character in the expression stored in the first memory means after the said push down cycle if the character in said first memory means is an operand, means for gating the level count indication stored in the upper position of the push down memory means into a level counter if the character in the first storage means is an operator, means operable to decrement the number stored in said level counter by one, means for initiating a push down cycle of said push down memory means if the said bistable device is set to its second state and for subsequently gating the number currently in said level counter into the level count field of the push down memory means, means for entering the number in the level counter directly into the level count field of the push down memory means if the bistable device is currently set to its first state, means for initiating a push down cycle of said push down memory means, means to continue the scan of the expression when the bistable means is currently set to its second state, means for first setting the bistable means to a "1" and then returning to the next step of the scanning cycle when the bistable means is set to its first state, and control means associated with said second scanning means to continue the scanning of said mathematical expression in said first memory means until the first term of said expression has been evaluated.

15. An automatic compiling system as set forth in claim 14 wherein the timing control circuitry for said latest relative time determining means in said second scanning means comprises:

a series of single shot multivibrators, each of which is capable of producing a pulse upon turning on and a pulse upon turning off, means connecting the turn off pulse of one multivibrator stage to a succeeding multivibrator stage where it is desired to have sequential operations, and means for supplying the turn off pulse of a particular multivibrator stage to a plurality of gate circuits in parallel and provide each of said gate circuits with an input pulse from one of a plurality of test circuits when it is desired to branch said timing control circuitry.

16. An automatic compiling system as set forth in claim 14 wherein the means for detecting when the mathematical expression is fully evaluated comprises:

means connected to the first memory means address register which provides an output pulse when the address register is decremented to a non-existent address in said first memory means.

17. An automatic compiling system for use with a multiprocessor computer organization as set forth in claim 14 including:

sorting means for indicating the storage area in said first memory means containing the operator having the lowest special level count number, said sorting means operating on the combined number formed by said first and second special level count numbers wherein said second number comprises the high order digit, means for extracting from said storage area in said first memory storage means the complete operation information stored with each operator including the operator itself, the result address where the result of the operation is to be stored, the address of the two operands related to said operator and the special level count number associated with each said operator, means to determine when a processor unit is available, means for transmitting the complete operation information from said first memory means to said processor upon command, means for determining whether the operands for said processor are raw data or the result of some previous operation, means for determining whether such previous operation has been performed, means to initiate the operation of the processor when it is determined that all operands are available, means for returning the result to the proper storage location in accordance with the result address provided with said operator, means for continuing said operations until all of the operations called for in said first storage means have been completed, and means for indicating that a processor is available for another operation as soon as a current operation is completed and the result stored.

18. A system for automatically compiling machine instructions for a mathematical expression written in grouped parentheses free notation and for supplying operations to a multiprocessor computer system whereby a high degree of parallelism of operation is accomplished as set forth in claim 14, said system comprising:

means for extracting from said first memory means a sequence of operations based on the first special level count numbers stored in said first memory means relatable to each operator, the extractions being made on command in ascending order, means for recurrently testing to see if any processor is available to perform an operation, means for transmitting a complete operation from said first storage means as determined by said extraction means to said available processor, said operations including the operator, the result address and the operand addresses, means for determining whether an operand is raw data or the result of another operation, means responsive to a determination that an operand is a result to detect whether the result is currently available, means responsive to a determination that all operands are currently available to provide a "perform operation" signal to said processor, means to store the result of an operation performed in any processor in a special result storage location at the result high address provided with the operation, means settable at each said result storage location address for indicating that a result is actually stored in said address, and means indicating that a particular processor is ready to perform another operation after storage of the result of its current operation.

19. An automatic compiling system as set forth in claim 18 wherein the extraction means includes:

means to make selections based on both said first and second special level count numbers stored with each operator wherein said second special level count number is utilized as the highest order digit in making the selection of operations which are to be supplied to processor units.

20. An automatic compiling systems as set forth in claim 18 wherein the means for determining whether an operand is raw data or the result of some other operation includes:

decoder means responsive to the address of either the special memory portion for storing results or a conventional memory address to provide an appropriate signal on one of two output lines indicating whether an operand is a raw data memory address or a result address.

21. An automatic compiling system as set forth in claim 20 above wherein the means responsive to detect the availability of a result includes:

means to interrogate an allocated portion of the special result memory location at the indicated address therein to determine whether a completion bit is stored at said special result memory location.

22. An automatic compiling system as set forth in claim 18 wherein the means for recurrently testing to see if a processor is available includes:

a test pulse generator capable of producing a first series of recurrent spaced pulses which are continually fed to special processor control circuitry for each processor, said control circuitry including:

bistable means which when set to a first condition indicates that the processor is available to perform an operation and prevents passage of this test pulse to any subsequent processor and which when set to the other condition indicates that the processor is currently busy and automatically passes the test pulse on to the next processor in the line.

23. An automatic compiling system as set forth in claim 22 wherein the means for transmitting the next operation from said first storage means to an available processor includes:

delay means whereby the resetting of said bistable device which indicates the availability of the processor is not accomplished until the next operation is completely transferred from said first memory means to said processor and the availability of this operation removed as an available operation from said first memory means.

24. An automatic compiling system as set forth in claim 22 wherein the means for determining whether an operand is raw data or a result and subsequently if a result whether said result is currently available comprises logical circuit means including:

a second test pulse source for testing the condition of the logic circuitry for each operand, said logic circuit means including a section for each operand, each section having an input for producing a particular circuit condition if the operand is raw data, or if the operand is a result address, each said section including a set of gates for passing said second test pulse therethrough if an operand address is that of raw data, each section including a further set of gates actuable to pass the second test pulse if an operand address is that of a result and if a completion bit is stored with the result in the result storage location, said section including means effective to prevent passage of said pulse therethrough in the event that a result and its completion bit are not currently available, each section of said logical circuitry for either operand including means for inhibiting the passage of the said second test pulse therethrough upon the occurrence of said condition, and means effective to produce an output pulse from said logical circuitry when all sections thereof are enabled, thus indicating that each operand is currently available, said output pulse providing a "perform operation" signal to the processor unit.

25. An automatic compiling system as set forth in claim 24 above wherein the means for providing the second test pulse produces pulses having much shorter periodicity than the time required for a processor to perform a calculation whereby each processor unit will have a minimum period of inactivity during the processing of any particular mathematical expression.

References Cited

UNITED STATES PATENTS

| | | | |
|---|---|---|---|
| 3,047,228 | 7/1962 | Bauer et al. | 235—157 |
| 3,200,379 | 8/1965 | King et al. | 340—172.5 |
| 3,229,260 | 1/1966 | Falkoff | 340—172.5 |
| 3,293,616 | 12/1966 | Mullery et al. | 340—172.5 |

ROBERT C. BAILEY, *Primary Examiner.*

O. E. TODD, *Assistant Examiner.*